US008082061B2

(12) United States Patent
Segal et al.

(10) Patent No.: US 8,082,061 B2

(45) Date of Patent: Dec. 20, 2011

(54) VENDING MACHINES WITH LIGHTING INTERACTIVITY AND ITEM-BASED LIGHTING SYSTEMS FOR RETAIL DISPLAY AND AUTOMATED RETAIL STORES

(75) Inventors: Mara Clair Segal, San Francisco, CA (US); Darrell Scott Mockus, San Francisco, CA (US); Russell Jon Greenberg, New York, NY (US)

(73) Assignee: Utique, Inc., San Francisco, CA (US)

( * ) Notice: Subject to any disclaimer, the term of this patent is extended or adjusted under 35 U.S.C. 154(b) by 292 days.

(21) Appl. No.: 12/589,164

(22) Filed: Oct. 19, 2009

(65) Prior Publication Data

US 2010/0100236 A1 Apr. 22, 2010

Related U.S. Application Data

(60) Provisional application No. 61/106,952, filed on Oct. 20, 2008.

(51) Int. Cl.
*G06F 17/00* (2006.01)

(52) U.S. Cl. ............ 700/232; 700/242; 700/244; 221/2; 221/8

(58) Field of Classification Search .................. 221/4, 5, 221/8; 700/232, 234, 242, 244
See application file for complete search history.

(56) References Cited

U.S. PATENT DOCUMENTS

| | | | | |
|---|---|---|---|---|
| 5,025,950 | A * | 6/1991 | Trouteaud et al. | 700/232 |
| 5,509,573 | A * | 4/1996 | Campoli | 221/133 |
| 5,831,862 | A * | 11/1998 | Hetrick et al. | 700/232 |
| 7,299,576 | B2 * | 11/2007 | Martin et al. | 40/544 |
| 7,383,099 | B2 * | 6/2008 | Pollard et al. | 700/232 |
| 7,584,868 | B2 * | 9/2009 | Bauch et al. | 221/95 |
| 7,950,817 | B2 * | 5/2011 | Zulim et al. | 362/125 |

* cited by examiner

*Primary Examiner* — Timothy Waggoner

(74) *Attorney, Agent, or Firm* — Stephen D. Carver

(57) ABSTRACT

Vending machines, automated retail stores, and retail displays with computer controlled, item-based lighting that produces variable visual effects in conjunction with actual or potential vends to provide an enhanced vending experience. Offered products are stored within display tubes that are arranged in orderly geometric arrays. RGB lighting through a plurality of LED banks within polygonal circuit boards associate with each display tube are controlled by a computer activation system that senses the presence of a customer, and the selection of a vend. Combinations of differently colored LED's are computer controlled on a per product basis to artistically illuminate available products and assist customers. Pre-programmed lighting sequences can switch LED off and on, vary their intensity, and alter resultant colors. A touch screen computer responds to user inputs for selections and transactions. Sensors detect the presence of potential customers, even without a customer input, to vary a display and attract mode.

20 Claims, 18 Drawing Sheets

VENDING MACHINES WITH LIGHTING INTERACTIVITY AND ITEM-BASED LIGHTING SYSTEMS FOR RETAIL DISPLAY AND AUTOMATED RETAIL STORES

CROSS-REFERENCE TO RELATED APPLICATION

This application is based upon U.S. Provisional Application, Ser. No. 61/106,952, filed Oct. 20, 2008, and entitled "Lighting Interactivity And Item-Based Lighting Systems In Retail Display, Automated Retail Stores And Vending Machines," by inventors Mara Segal, Darrell Mockus and Russell Greenberg, and priority based on said application is claimed.

BACKGROUND OF THE INVENTION

1. Field of the Invention

The present invention relates generally to automated vending machines. More particularly, the present invention relates to smart, computer controlled interactive vending machines equipped with enhanced lighting and display systems for producing a variety of visual effects in conjunction with vends or potential vends in conjunction with automated retail and or interactive retail deployments and retail displays.

2. Description of the Related Art

Numerous prior art vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or PCs and virtual interfaces. These new vending platforms have emerged in the marketplace under the popular descriptions "automated retail," "interactive retail," and/or "interactive retail displays." Such vending machines may be deployed within a variety of retail or commercial settings. They typically include illuminated, visual displays that seek to attract and educate customers or potential customers. Products information may be customer-requested utilizing interactive displays, including touch screen computer interfaces and virtual interfaces. However, a disadvantage of known machines relates to their cumbersome and "mechanical" appearance.

Automated retail stores, vending machines, and/or retail display platforms still look and feel like large, unfriendly machines or "mechanical boxes." Such machines provide potential customers with a cold, impersonal and indifferent impression, which is not conducive to maximizing sales. Such prior art vending machines lack the sophistication of traditional retail stores in both the end user and retail display experience. This is due to the standard lighting, interfaces, and display mechanisms within these platforms. Displays are limited in the amount of information that can be communicated about a product. They are limited by space constraints. Further, they fail to provide the depth of information found in many e-commerce portals. Additionally, information on products within traditional automated retail/vending platforms has historically been limited to either the virtual touch screen or the physical display and there is no perceptual link between touch screen information and products being displayed beyond digital images on the touch screen.

Typically, the presentation of merchandise and information offered by traditional vending machines has not evolved sufficiently to satisfy a discerning consumer of premium or upscale products. Thus, the lack of a premium design or appearance has proven to be a hurdle for the distribution of expensive luxury items in automated vending machines.

In addition, default methods for lighting vending machines and automated retail stores are also utilitarian and dated. The default method of lighting in vending machines has been a fluorescent tube system which may either backlight or peripherally light the products, buttons, or displays. This method is less energy efficient, requires frequent changing of lights, is limited in functionality, and casts the same quality of light across all vending products. Fluorescent lighting also has hazardous consequences for the environment.

It is thus desirable to provide an enhanced vending experience or ambience in conjunction with the vending of upscale products. To increase the attractiveness of an upscale vending machine, it is desirable to provide an enhanced LED (light emitting diode) lighting system that can be individually controlled on a per product basis to more artistically illuminate available products, to guide users towards specific products, to draw users in to the machine, to indicate certain user inputs, to delight users during the shopping process, and to maximize the ambience associated with the transaction. It is further desirable for an ideal upscale vending machine to interactively guide user inputs, to indicate product recommendations and selections, and to elevate the merchandising experience achieved through an automated vending platform to approximate that of a luxury or specialty store.

BRIEF SUMMARY OF THE INVENTION

This invention provides an enhanced, customer interactive vending machine ideal for upscale products for use within an automated retail store or commercial environment. Importantly, the instant vending machine utilizes enhanced lighting that can be individually controlled on a per product basis to better light and display products and interact with the customer This invention uses LED lights on controllers with the capability to shape the quality, intensity, and color of light on a granular/per product basis through placement and software programming that integrates lighting changes with diverse sensor inputs including motion sensors, pressure profile sensors, and touch screen selections inputted by users. The preferred system works on an individual product basis to both enhance the lighting on a product and facilitate user interaction. This invention also uses a virtual network by which software that controls the LED controllers and lighting experience can be updated remotely without visiting the individual store or changing the bulbs and fixtures. The invention includes programmable LED lighting, sensors that detect motion through touch and human gesture, and software that integrates the functionality of these components that can be updated through a remote/virtual network.

The lighting system facilitates choreography of light events to user presence and responds to user inputs to guide the user through selections and transactions. It also performs 'passive' lighting events in a "display and attract." Lights may be switched on or off through varying sequences, light intensity and directionality may be varied, and assorted color combinations may be displayed to engage passerby's. This lighting system can be integrated with audio systems and additional display components through software. By virtue of this invention, lighting is also able to be custom designed on a per product basis with individual display units that comprise a greater merchandising display of several individually illuminated products. Lights are controlled on the basis of intensity and color balance to best enhance the product for easier viewing and more attractive display.

The enhanced functionality, flexibility, and control of the preferred lighting system allows for superior merchandising, efficiency and ease of the user experience, greater energy efficiency, and cost savings in terms of labor to replace lighting that does not have efficiency of LEDs. In addition, the LED system can be adjusted to harmonize with the ambient light quality of the room. In a dimmer environment, like in a hotel lobby or spa, the base level of brightness to the machine will be set lower than if the machine is placed in a very well lit environment, such as a department store. In conclusion, as far as we are aware, no lighting system of flexible LEDs and integration of LEDS onto a virtual network within an automated retail store, vending machine, or retail display exists for ease of customization, configuration, intuitive interfacing, utilization and low-cost of maintenance of this system.

Preferably a plurality of RGB (red, green, blue) and white LEDs provide programmable, highly customizable lighting that responds to sensors and software for a unique visual experience. Various LEDs are disposed on controllers within an architectural system of boards that fit display custom modules. An additional system of sensors (motion detectors, touch and pressure point) is programmed to interface with the lighting through software that controls the lighting. A touch screen which deploys information also interfaces with the lighting through the software. This software is able to be updated over a virtual network enabling quick adaptation to lighting events for multiple stores and removing visits to individual displays for adaptations. The sensors tell the software when a user is interfacing with the display (a product or products), and/or approaching the store (either passive or active engagement).

Touching the display activates a lighting event through a pressure-based profile sensor which triggers LEDs to brighten, or dim, change color, or turn on/off. During a passive state, the LED system is able to produce lighting sequences (shows) that are pre-programmed and involve LED lighting turning on/off, increasing in intensity, and/or altering in color based on a design that has been set in a configuration file and read real-time by the software.

Beyond approaching the automated store and LED lighting correspondingly responding through a state change, or by a user touching a plane in front of a product to indicate a selection and lighting correspondingly responding through a state change, lighting is also programmed to respond to state changes in the automated store (entering into a passive mode, or indicating lack of inventory) through a state change in lighting. In addition, LED lighting within the display also responds to inputs that the user makes within the touch screen portion of the display (a separate, but integrated monitor that contains digital information that the consumer interfaces with to operate the machine or engage with promotional content). Through selections and operations performed on this touch screen corresponding LED lighting events occur within the display—example, if a product is selected for purchase, the product module in the display will brighten and/or change color.

Examples of LED lighting state changes include: if a product is being dispensed by the robotic arm (or when a mechanical component is working), the lighting can blink. If a user is being prompted to swipe a credit card, LED lighting around the base of the card slot can blink. If the robot is dispensing a product, the product retrieval area will become illuminated when the product is in place for retrieval. If a product recommendation is being made based on inputs that the user has made, or information that has been stored about the user from prior use sessions, lighting may indicate a recommended product through brightening, dimming, blinking, or changing in color. If a product is indicated to be 'out of stock' frontal lighting in the module can dim, or turn off completely. The system of sensors and lighting in the interactive retail display/vending platform allows a user to seamlessly select a product by physically touching a display 'unit' on the frontal plane of this unit (a system of which comprises the façade of the store/sign/display). The lighting of this 'unit' brightens as the user's hand or body part approaches it and the 'unit' becomes highlighted when touched to indicate that a product has been selected or interfaced with. In other words, users may directly touch the display to select an item for dispersion and presentation on the touch screen where the transaction may be completed.

Touching the display or touch screen can also perform other actions, including the retrieval of additional information about the product including product recommendations. Several advantages occur. A user experience results which is more intuitive and interactive and hence more engaging than that experienced with ordinary machines. A more efficient lighting system with lower maintenance requirements and remote maintenance capabilities minimizes required service. The merchandising display can more attractively and precisely light individual products. The remotely customizable and individually configured LED vending machine lighting system increases the machine attractiveness. An intuitive way is provided to indicate when a product is "out of stock" without empty store shelves, which ordinarily tarnishes the store experience. An intuitive grouping method is provided to tie similar products together, to make sure the range of available products that a customer might be seeking is made known.

Thus a basic object of our invention is to provide a simpler, more intuitive, efficient and entertaining method of selecting a product, or multiple products, with an automated vending machine.

Another important object is to provide an interactive retail display in the form of a vending machine that uses interactive lighting and produces variable lighting effects in response to user inputs.

Other objects are as follows:

a) to provide a method for guiding the selection of a product with a user's hand or body motion.

b) to provide a method for triggering lighting events and/or promotional events in an automated retail store, vending machine, or retail display to attract the attention of passer-by's.

c) to use lighting in an automated retail store, vending machine, or retail display to indicate product recommendations (i.e., cross-sell and up-sell techniques).

d) to use lighting in an automated retail store, vending machine, or retail display to group products in logical groupings by. brand, category, price, etc.

e) to use lighting in an automated retail store, vending machine, or retail display to enhance the efficiency of customer product selections.

f) to aid customers in recall selections (indicating a single product selection vs. multiple product selections, indicating a selection has been made).

g) to use lighting to engage a user approaching the store and indicate the beginning of a usage session in an automated retail store, vending machine, or retail display.

h) to provide methods that make a vending, automated retail store, or retail display experience feel more special and premium.

i) to provide methods to make an automated retail store, vending machine, or retail display more intuitive.

j) to provide methods to make an automated retail store, vending machine, or retail display more educational and responsive to customer inputs.

k) to provide methods to make an automated retail store, vending machine, or retail display feel less mechanized and more interactive and/or responsive to a user.

l) to provide a method to increase interactivity of an automated retail store, vending machine, or retail display.

m) to provide methods to make an automated retail store, vending machine, or retail display more intuitive through use of lighting, sensors, and software.

n) to indicate to users through light the ability to access information on a product by touching a physical display of the product.

o) to individually custom light products within an automated retail store, vending machine, or retail display environment.

p) to perform entertaining lighting sequences within an automated retail store, vending machine, or retail display.

q) to enhance the presentation of merchandise within an automated retail store, vending machine, or retail display.

r) to individually feature a product through interactive lighting design within an automated retail store, vending machine, or retail display.

s) to use lighting to provide an intuitive method to indicate when a product is 'out of stock' within an automated retail store, vending machine, or retail display.

t) to provide a system to remotely customize and update lighting sequences of automated retail store, vending machine, or retail displays that have been deployed in the field.

u) to facilitate user interactions with the automated vending process or retail display by guiding product selections and providing a visual reminder of products that have already been selected by the user.

v) to provide an intuitive way to guide the user through interaction and purchase with enhanced lighting effects that sensually amplify the perceived vending and shopping experience.

w) to provide a remotely customizable lighting system in an automated store/vending machine, or retail display that saves the costs of lighting re-design for merchandising shifts.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
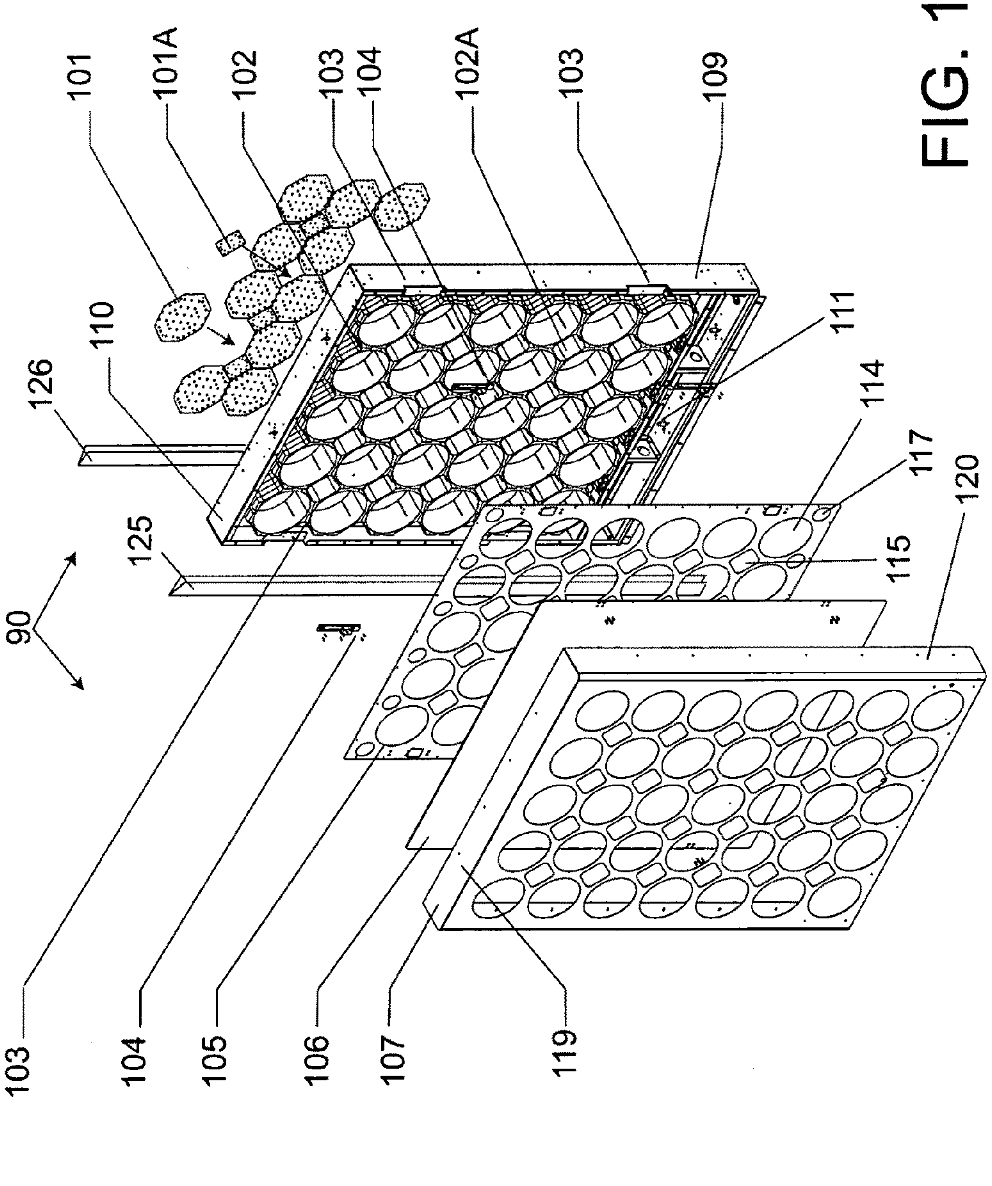
FIG. 1 is an exploded, isometric assembly view of a preferred display module assembly used with the vending machines of the invention.
Figure 2:
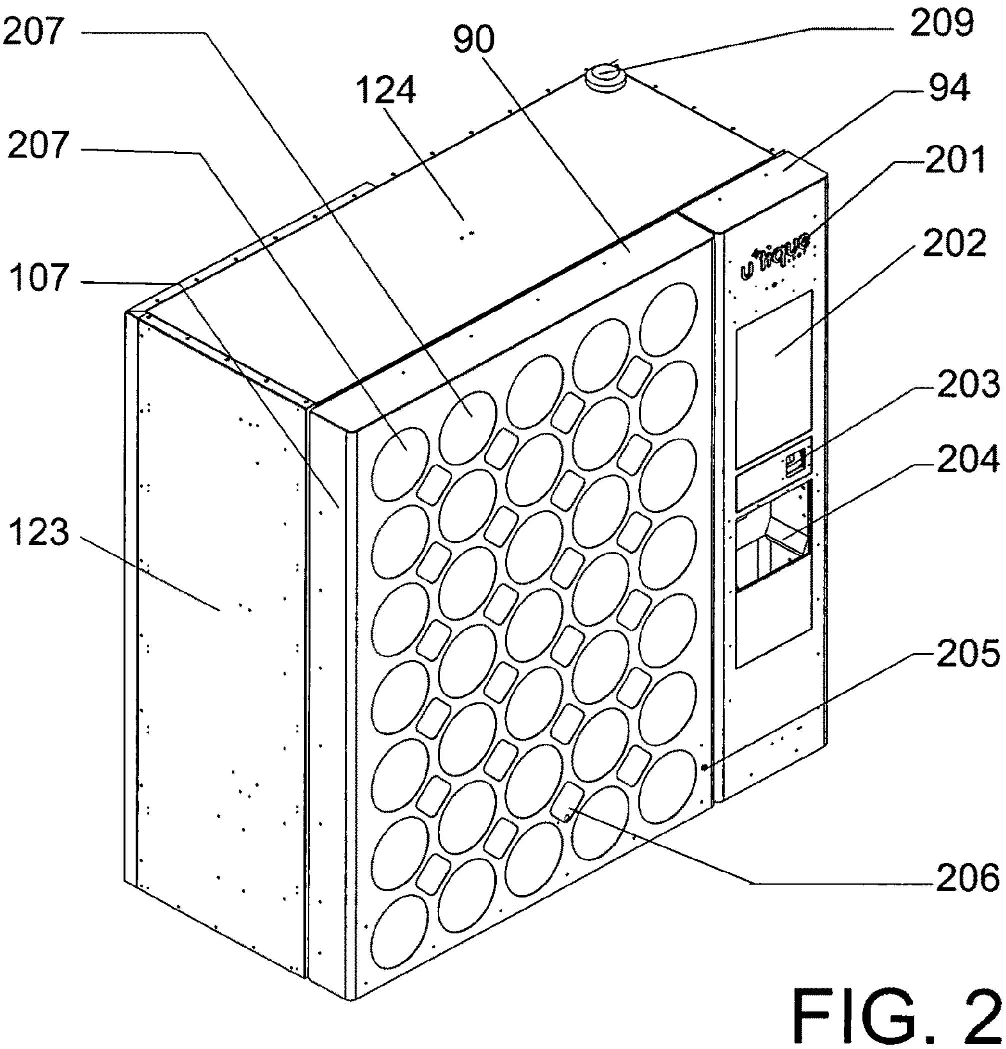
FIG. 2 is an isometric view of the assembled vending machine module of FIG. 1.

With initial reference directed to FIGS. 1-2 of the appended drawings, a lighting system display module constructed generally in accordance with the best mode of the invention has been generally designated by the reference numeral 90. A vending machine console equipped with the instant display case lighting arrangement has been generally designated by the reference numeral 92 (FIG. 2). Lighting system 90 includes a variety of hardware and software adaptations to facilitate the various objects and advantages discussed above when integrated within a vending machine. Lighting effects are established by various circuits that control various LED-equipped circuit boards in response to software discussed hereinafter. Lighting circuit boards and components are disposed upon various product display and vending modules that are visible from the front of the vending machine 92 (FIG. 2).

Referencing FIGS. 1 and 4, a plurality of LED octagonal circuit boards 101 are arranged into geometric arrays and patterns in orderly rows and columns. Smaller, generally rectangular, secondary LED circuit boards 101A are arranged between LED boards 101. The shape of the boards 101, 101A is not critical, and they can be circular, triangular, rectangular, or other shapes, depending upon the artistic impression desired. Preferably the boards are polygonal, and in the best mode illustrated herein, they are octagonal. Boards 101, 101A are fastened within display case 103. A plurality of primary display tubes 102 arranged in an array comprising rows and columns line up with the LED circuit boards 101. The preferably, tubular plastic display tubes 102 have a generally circular cross section, into which the octagonal circuit boards 101 fit. A plurality of smaller, secondary display tubes 102A are disposed between display tubes 102 in an orderly fashion to register with rectangular LED circuit boards 101A. Display case 103 is generally rectangular, and box-like, comprising bordering sides 109, a top 110, and bottom 111, the width of which established a sufficient depth to shroud the display tubes 102 and related components.

A plurality of sensors 104 are coupled between selected display tubes extending through the extrusion cover mounting plate 105 and connected to the exposed window of display case 106. A plurality of circular orifices 114 are defined in plate 105 to align with display tubes 102. Rectangular orifices 115 (FIG. 1) align with display tubes 102A. A plurality of smaller auxiliary orifices 117 are located about the periphery of extrusion cover mounting plate 105 for wiring.

A generally rectangular, translucent glass or plastic window 106 is secured over extrusion cover mounting plate 105. Window 106 is preferably clear and translucent for visibility. Display case 103, extrusion cover mounting plate 105 and window 106 are secured in overlying relationship within the module 90 by a rigid exterior casing 107 that shrouds the apparatus. Casing top 119 and sides 120 comprise a plurality of spaced apart mounting holes for suitable fasteners. Casing top 119 and sides 120 are attached to the display case 103 with a hinge 125 that allows access to the areas where the products are displayed.

Products featured for a vend are stored within display tubes 102 and/or 102A for illumination in accordance with the lighting scheme described in detail below. Products to be vended are stored in the rear of the vending machine 92 (FIG. 2) in a conventional fashion, and payment is received via a credit or debit transaction or alternative payment method such as a coin or dollar input accomplished with conventional coin acceptance machines and conventional vending circuitry known to those with skill in the art. Selected products are vended though conventional passageways in the vending machine to which console 92 is mated.

The illustrated embodiment includes five columns and seven rows of displays, but alternative arrays with different number of rows and columns can be used.

FIG. 2 shows the display module 90 integrated into the console 92 of an automated retail vending machine. The display module can be attached with a hinge 126 to a vending machine comprised of a rigid upright cabinet with rigid sides 123 and top 124 or mounted to a solid structure as a stand-alone retail display. The display module 90 forms a door that is hinged to the cabinet sides 123 adjacent a vertical control column 94. A variety of door configurations known in the art can be employed. For example, the display doors can be smaller or larger. Or the display doors can be located on one or both sides of the totem area. Or the display doors can have square, oval, circle, diamond, rectangular or any other geometrically shaped windows. Or the display area can have one big window with shelves inside.

A customizable, lighted logo area 201 (FIG. 2) is disposed at the top of column 94. Touch screen display 202 is located below area 201. Panel 203 locates the machine payment system, coin acceptor machine or the like. Additionally panel 203 can secure a receipt printer, keypad, or other access device. The product retrieval area is disposed beneath the console 92 in a conventional compartment (not shown). A key lock 205, which can be mechanical or electrical such as a punch-key lock, is disposed beneath the face of the module 90. One or more motion sensors 206 are disposed within smaller display tubes 102A within the console interior. There are a plurality of generally circular touchable product viewing areas 207 areas defined upon the outer the face of the casing 107 that are aligned with internal display tubes 102 tubes previously described. Areas 207 include proximity or touch sensors described hereinafter that are used for customer selection. The generally cylindrical display areas formed between areas 207 and the display tubes 102 within the machine are internally illuminated to highlight products for vending and to provide visual effects as described hereinafter.

FIG. 3 details the configuration of the internal lights. An array 300 of LED circuit boards 301 are assembled to match the product display areas in the illustrated preferred configuration. Alternative shapes and configurations such as squares can be used. Square circuit boards and display modules can be virtually combined through software programming to make up other display shapes. A spacer 302 comprising a plurality of cylinders offsets the circuit boards 301 keep the LED lights on boards 301 a modest distance away from the generally rectangular light diffuser panel 304. A generally rectangular frame 303 secures LED boards 301, spacer 302, and the diffuser panel 304 in assembly. The diffuser panel is preferably made of translucent material (such a polycarbonate material) that blurs and blends the light. LED lights on boards 301 are designed as a combination of RGB lights (red, green, and blue) that can be illuminated in various intensities to make up all of the colors of the spectrum. The diffuser helps blend these individual lights into a consistent color across the display areas.

Figure 3A:
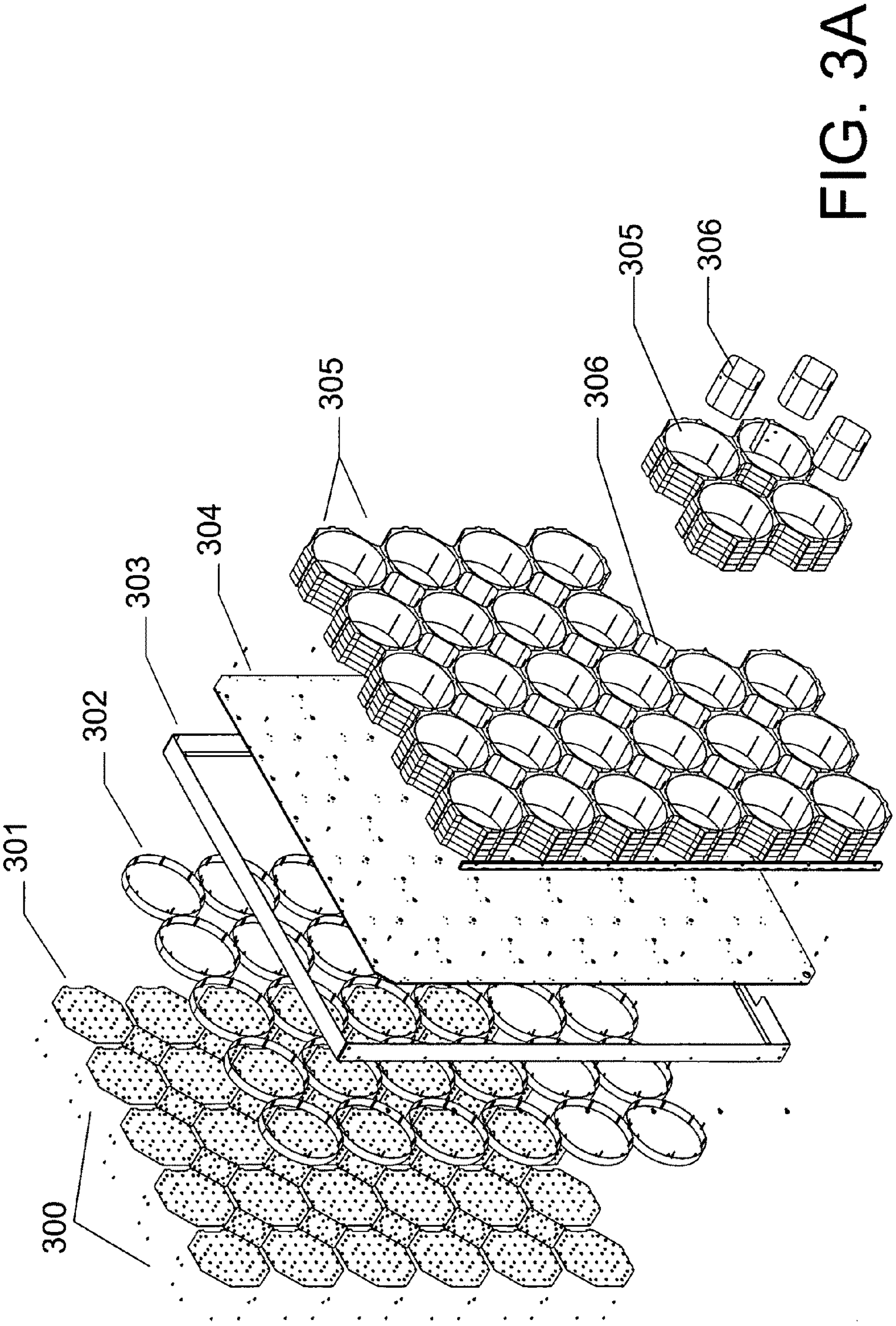
FIG. 3A is an exploded isometric view showing the preferred display case components, with portions thereof omitted for brevity or shown in section for clarity.

In FIG. 3A the display tubes 305 are similar to the plastic display tubes 102 (FIG. 1) discussed earlier. In this embodiment, a plurality of smaller display tubes 306 with a diamond-shaped cross section are positioned between alternate display tubes 305 inside the display.

Figure 3B:
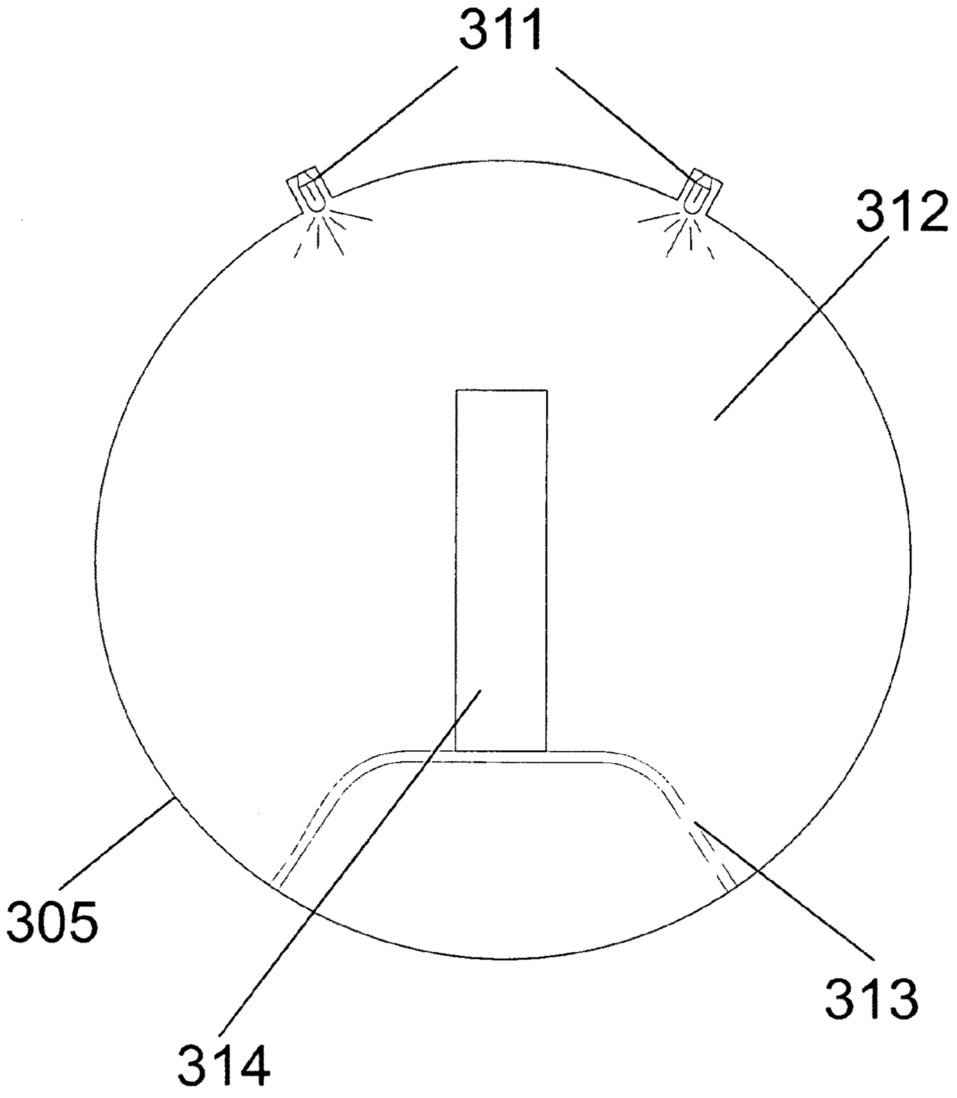
FIG. 3B is frontal view of a circular display tube.

FIG. 3B shows a frontal view of a display tube 305 (FIG. 3A). Two front white showcase lights such as Cree XLamp® 7090 XRE (part number L1-WN-P4-0-01) 311, are mounted in the top of the tube. The octagonal board 312 sits at the back of the tube. A displayed product 314 rests on top of an inserted shelf 313. Different sized shelves can be used to best display the product.

Figure 3C:
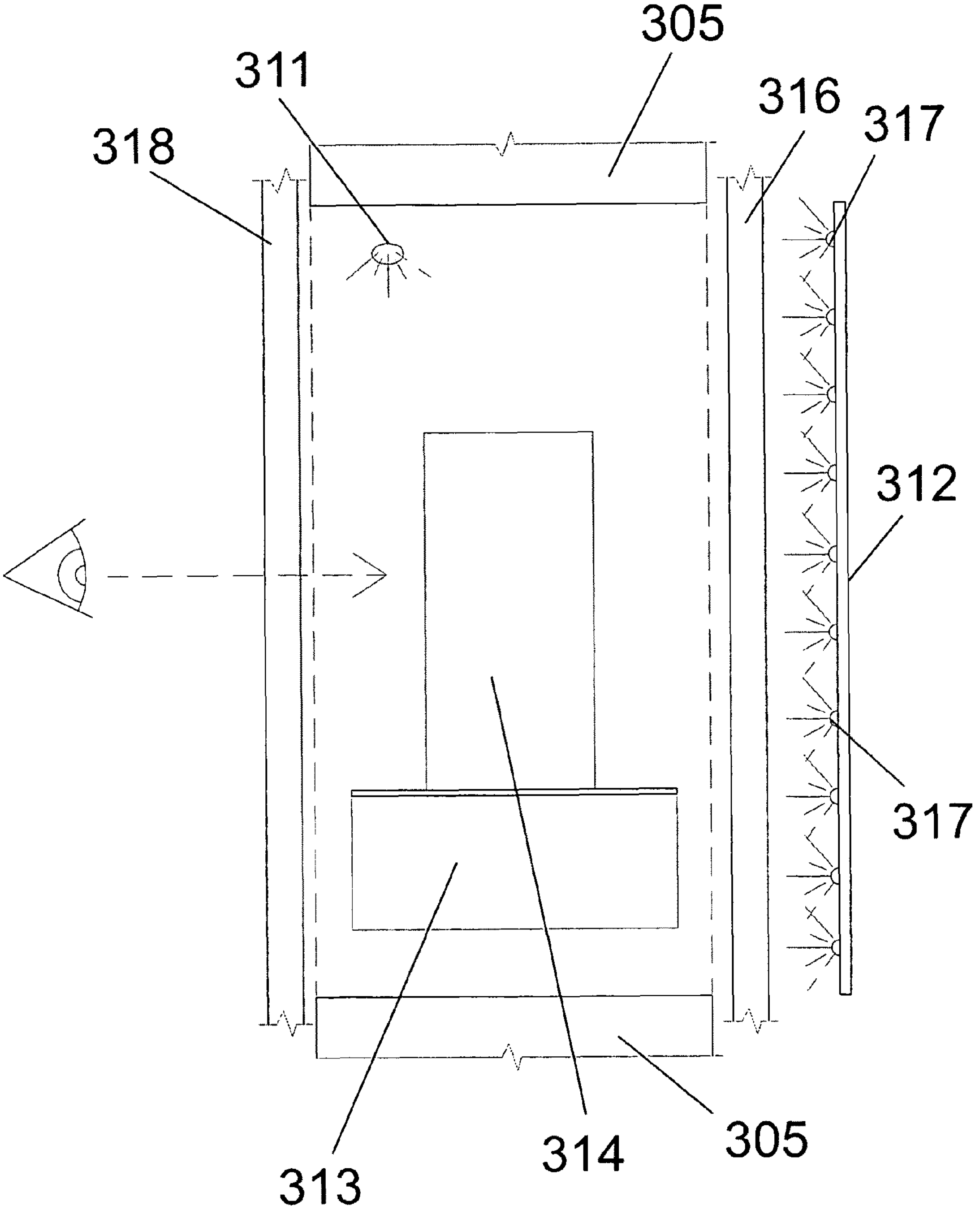
FIG. 3C is a sectional view of a circular display tube.

FIG. 3C shows a side sectional view of a display tube 305 (FIG. 3A). Two front white showcase lights such as Cree XLamp® 7090 XRE (part number L1-WN-P4-0-01) 311, are mounted in the top of the tube. An octagonal shaped LED board 312 sits at the back of the tube that contains a plurality of RGB light sets 317. The LED board is mounted behind a light diffuser 316. A displayed product 314 rests on top of an inserted shelf 313. Different sized shelves can be used to best display the product. The product 314 and shelf 313 sit behind a transparent material such as a piece of glass or plastic.

Figure 3D:
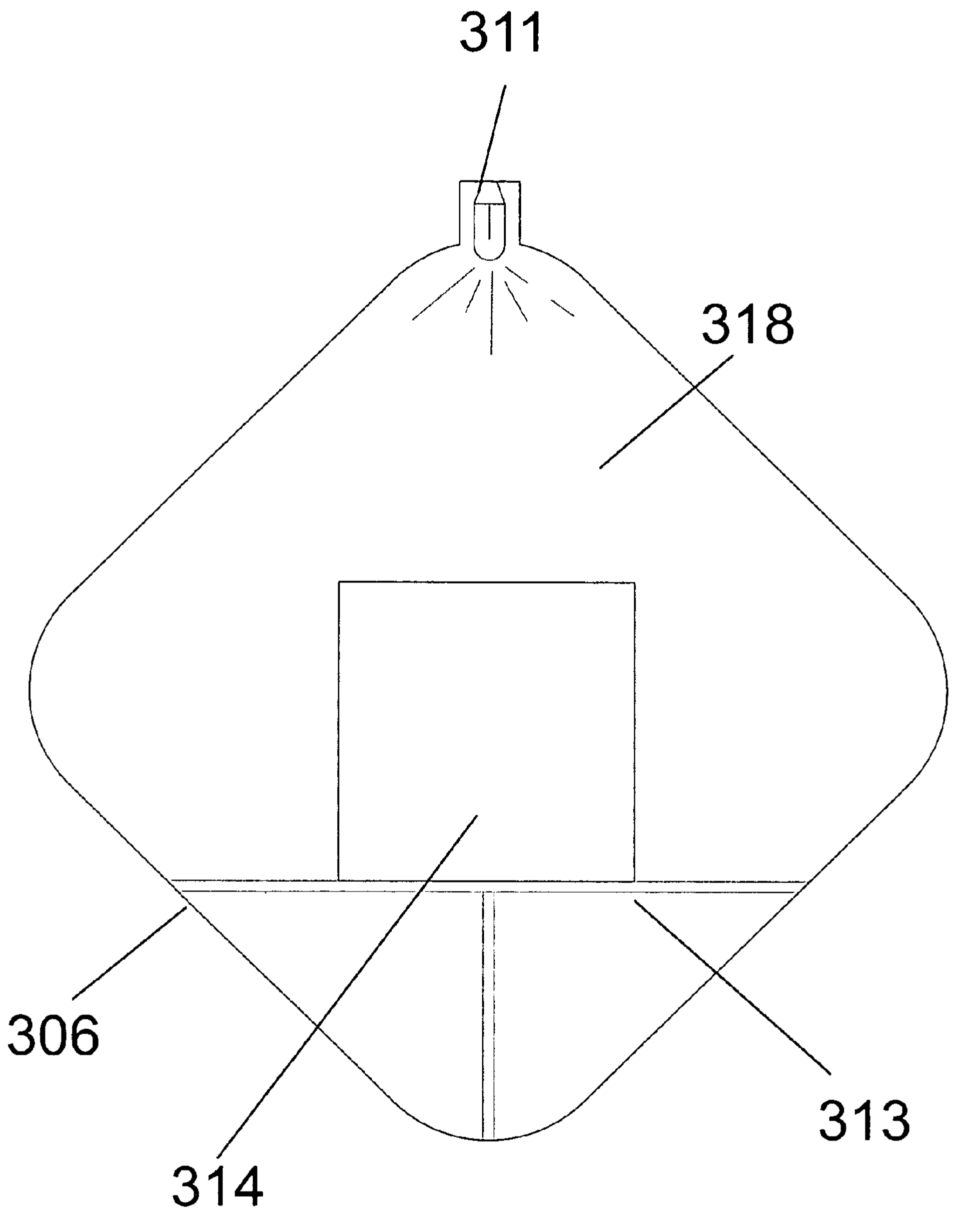
FIG. 3D is frontal view of a diamond shaped display tube.

FIG. 3D shows a frontal view of a diamond shaped display tube 306 (FIG. 3A). Two front white showcase lights such as Cree XLamp® 7090 XRE (part number L1-WN-P4-0-01) 311, are mounted in the top of the tube. A diamond shaped LED board 318 sits at the back of the tube. A displayed product 314 rests on top of an inserted shelf 313. Different sized shelves can be used to best display the product.

Figure 3E:
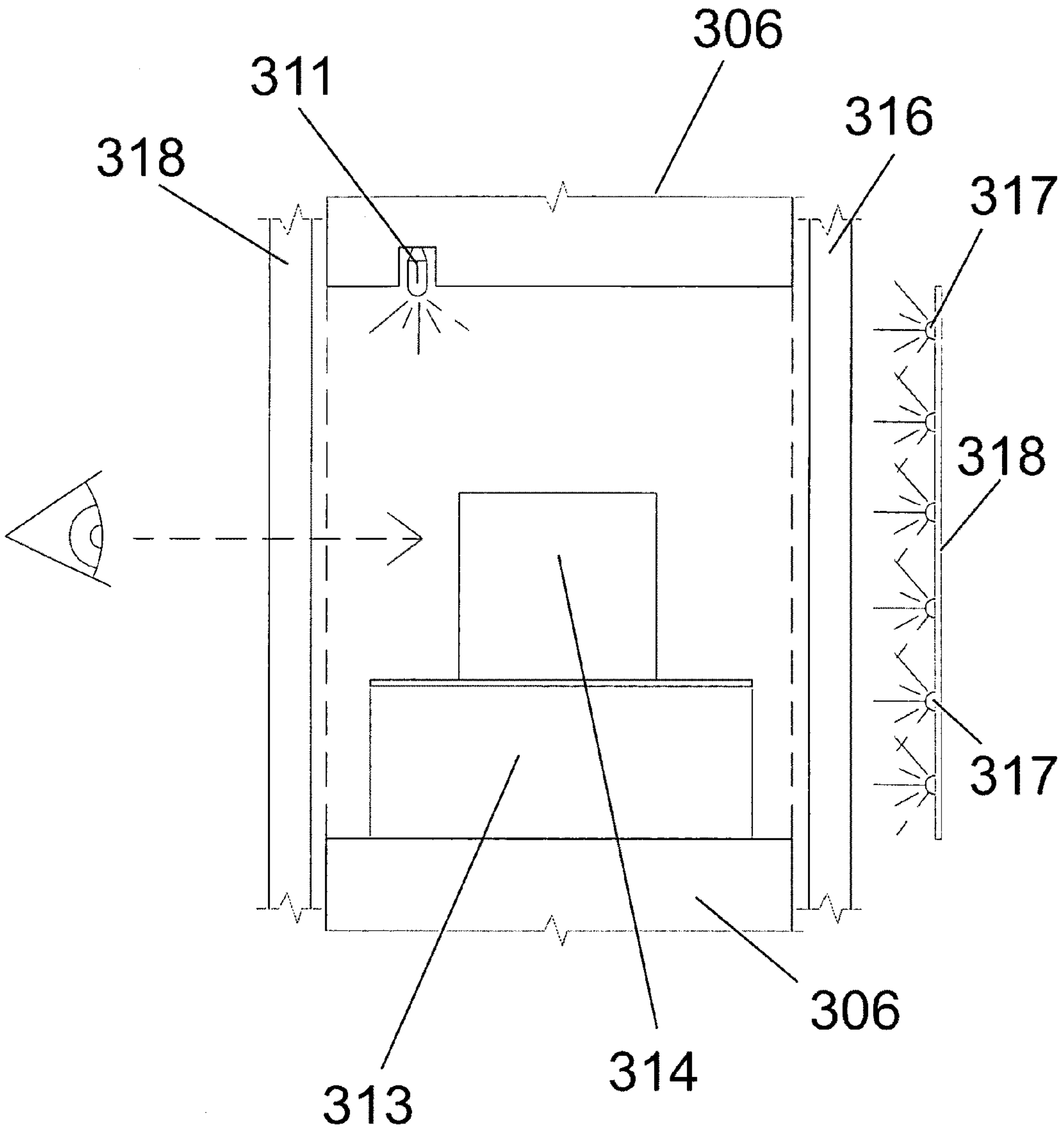
FIG. 3E is a sectional view of a diamond shaped display tube.

FIG. 3E shows a side crosscut view of a diamond shaped display tube 306 (FIG. 3A). A front white showcase light such as Cree XLamp® 7090 XRE (part number L1-WN-P4-0-01) 311, are mounted in the top of the tube. The diamond shaped LED board 318 sits at the back of the tube that contains a plurality of RGB light sets 317. The LED board is mounted behind a light diffuser 316. A displayed product 314 rests on top of an inserted shelf 313. Different sized shelves can be used to best display the product. The product 314 and shelf 313 sit behind a transparent material such as a piece of glass or plastic.

Figure 4A:
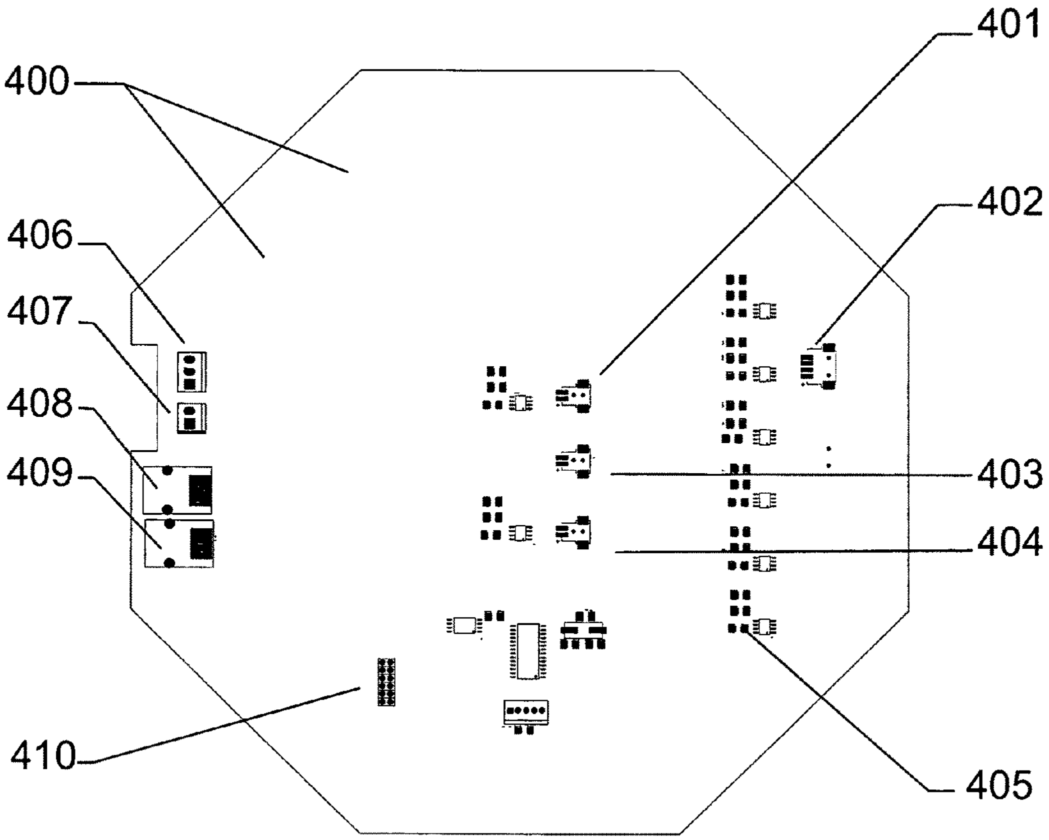
FIG. 4A is a rear plan view of a preferred LED lighting circuit board showing a plurality of LED connectors and associated signal and power connectors and components disposed in one possible configuration.

FIG. 4A a typical LED light circuit board 400 similar to circuit boards 101 and/or 301 is detailed. The circuit LED board is designed in such a way that can be used as part of a series of lights that cover a predesigned display area. The board can be cut in any shape and assembled into any pattern as determined by the product display area. In the preferred example, boards 400 can be cut in an octagonal fashion. This shape allows them to properly illuminate circle display areas. Diamond cut boards 440 (FIG. 4C) can be used in conjunction with these to create a circle and diamond display motif.

A plurality of boards 400 form an array such as array 300, and are interconnected. The front side of each board 400 contains one or more sets of three LED lights, providing a red, green and blue light sources. Wiring connections 405 connect with a plurality RGB LED lights mounted on the front side of the board 400. A wiring connection 401 connects to white "showcase" lighting on an adjacent board in an array, such as array 300 (FIG. 3). A wiring connection 402 is for an adjacent LED board containing a plurality of Red, Green and Blue LED lights such a square or diamond shaped backlight board as the display area warrants.

A wiring connection 403 couples to a white showcase light working in concert with the current LED backlight board 400. Wiring connection 404 couples to another showcase light for the current LED board to provide stereo front lighting. Power connection 406 powers an LED backlight board consisting of a plurality of RGB LED lights, one or more front showcase white lights, and an adjacent backlight board consisting of a plurality of RGB LED lights and one or more front white showcase lights for that adjacent board. Connection 407 enables an RS-485 connection to the board's components. Recommended Standard 485, also known as EIA-485, is a standard for serial binary data signals connecting between a DTE (Data Terminal Equipment) and a DCE (Data Circuit-terminating Equipment).

A female 8P8C (four twisted copper wire pairs) wiring output jack 408 sends the communication signal to the next board in the daisy chain or goes to a terminator if it is the last in the chain. A female 8P8C (four twisted copper wire pairs) wiring input jack 409 that receives the digital signal from the DMX-controller 622 discussed later, either directly if it is the first board in the chain or from the previous board if it is in the daisy chain. The board also contains a set of address pins and board reset terminal 410. This allows the board to be assigned an address so it can read signals sent from network interface established by the digital DMX controller 622. A forced connection across pins 5 and 6 resets lighting circuit boards to the base state.

Figure 4B:
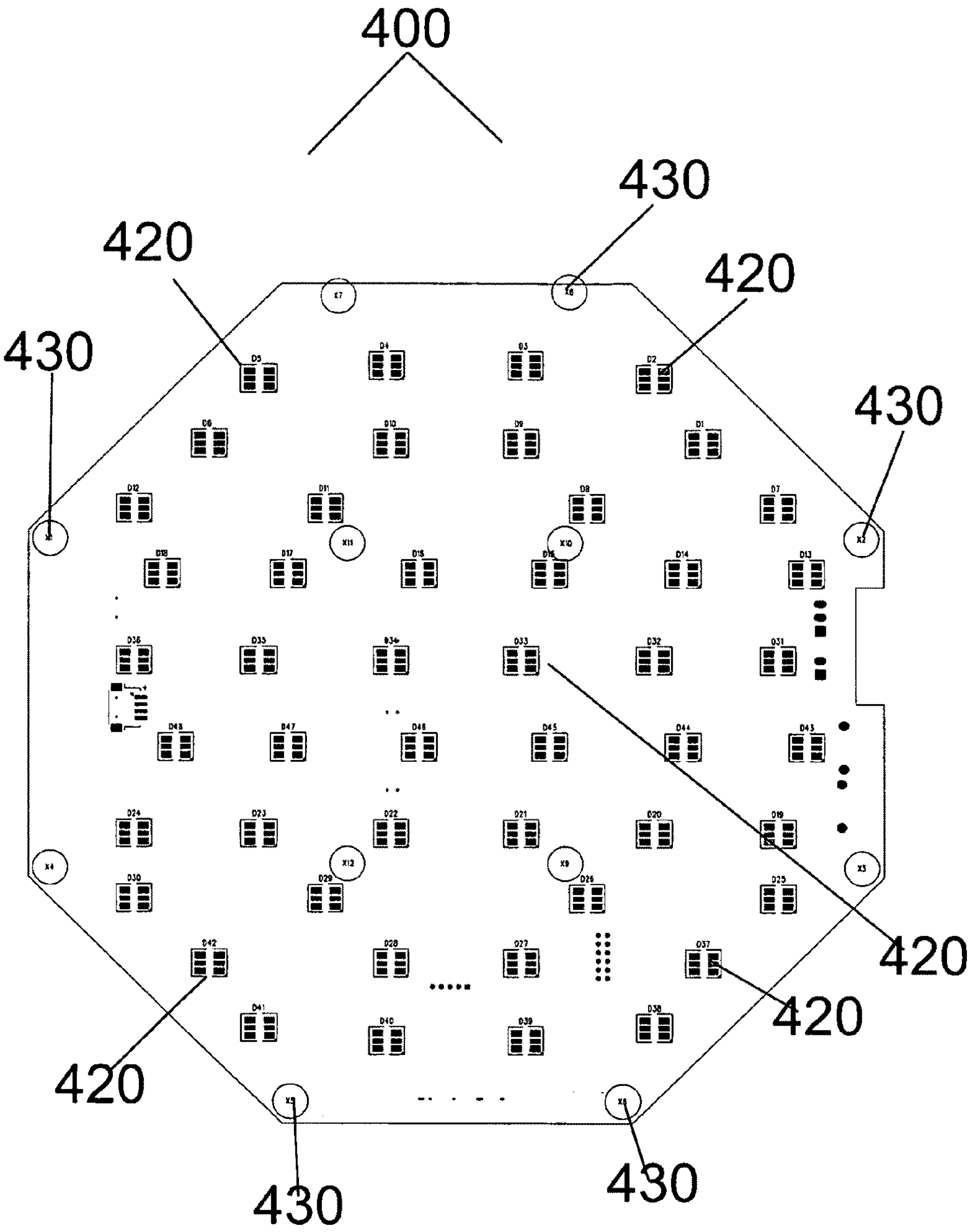
FIG. 4B is a front plan view of a preferred LED lighting circuit board showing a plurality of LED's in one possible configuration.

FIG. 4B illustrates the front of LED board 400. LED light sets 420 each consisting of a red, green and blue light. There are a plurality of these light sets providing even coverage across the entire board. Mounting holes 430 exist around the perimeter and center of the board to allow screws to be inserted through the spacers 302 and into the diffuser panel 304 that is mounted in the display case 103.

Figure 4C:
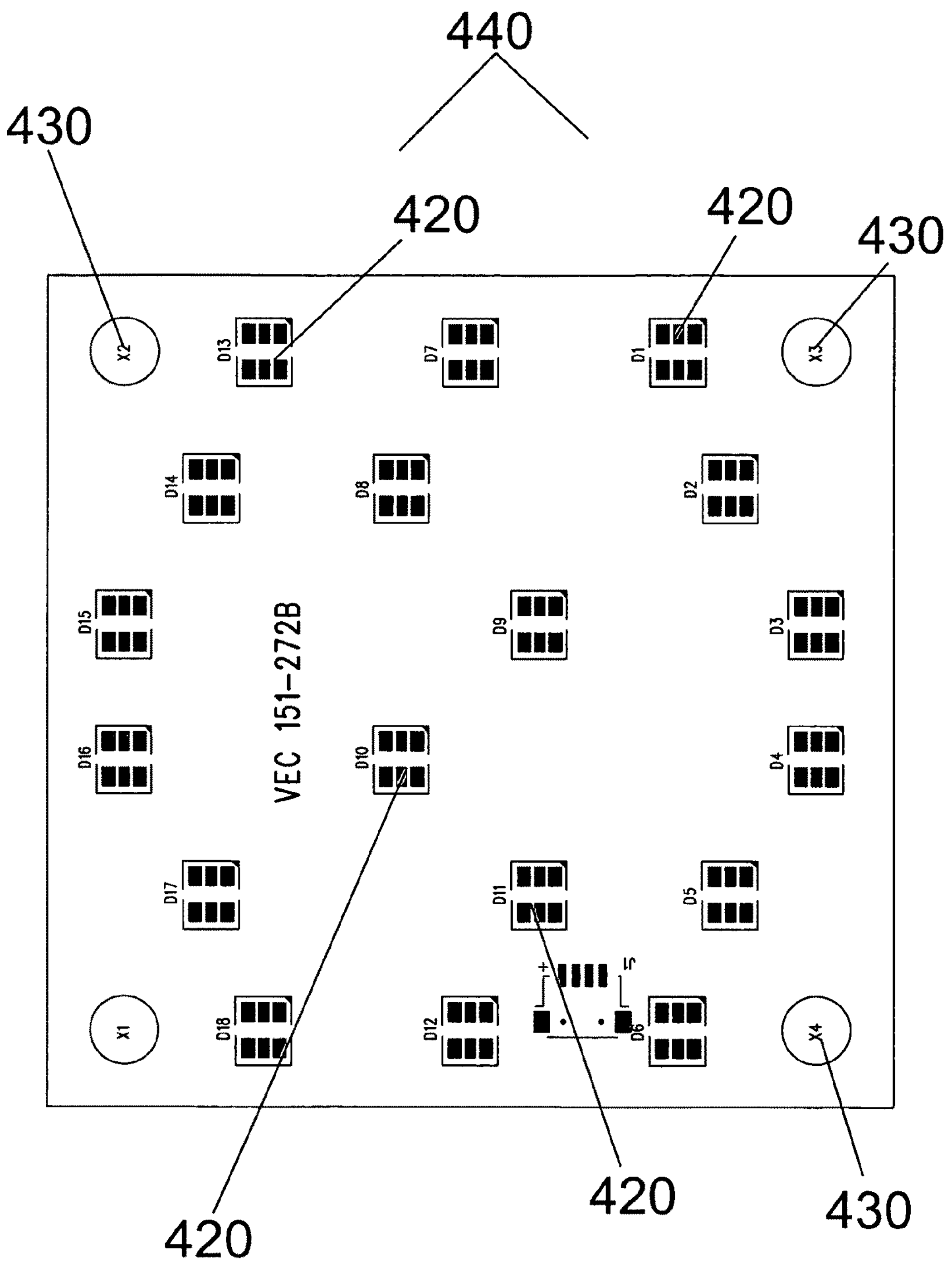
FIG. 4C is a front plan view of an alternatively shaped preferred LED lighting circuit board showing a plurality of LED's in one possible configuration.

FIG. 4C illustrates an alternative supplementary LED board 440. This board is cut in a square fashion to mount between the octagonal boards 400 (FIG. 4) to cover the front of the display. LED light sets 420 each consisting of a red, green and blue light. There are a plurality of these light sets providing even coverage across the entire board. Mounting holes 430 exist around the perimeter and center of the board to allow screws to be inserted through the spacers 302 and into the diffuser panel 304 that is mounted in the display case 103.

Figure 5:
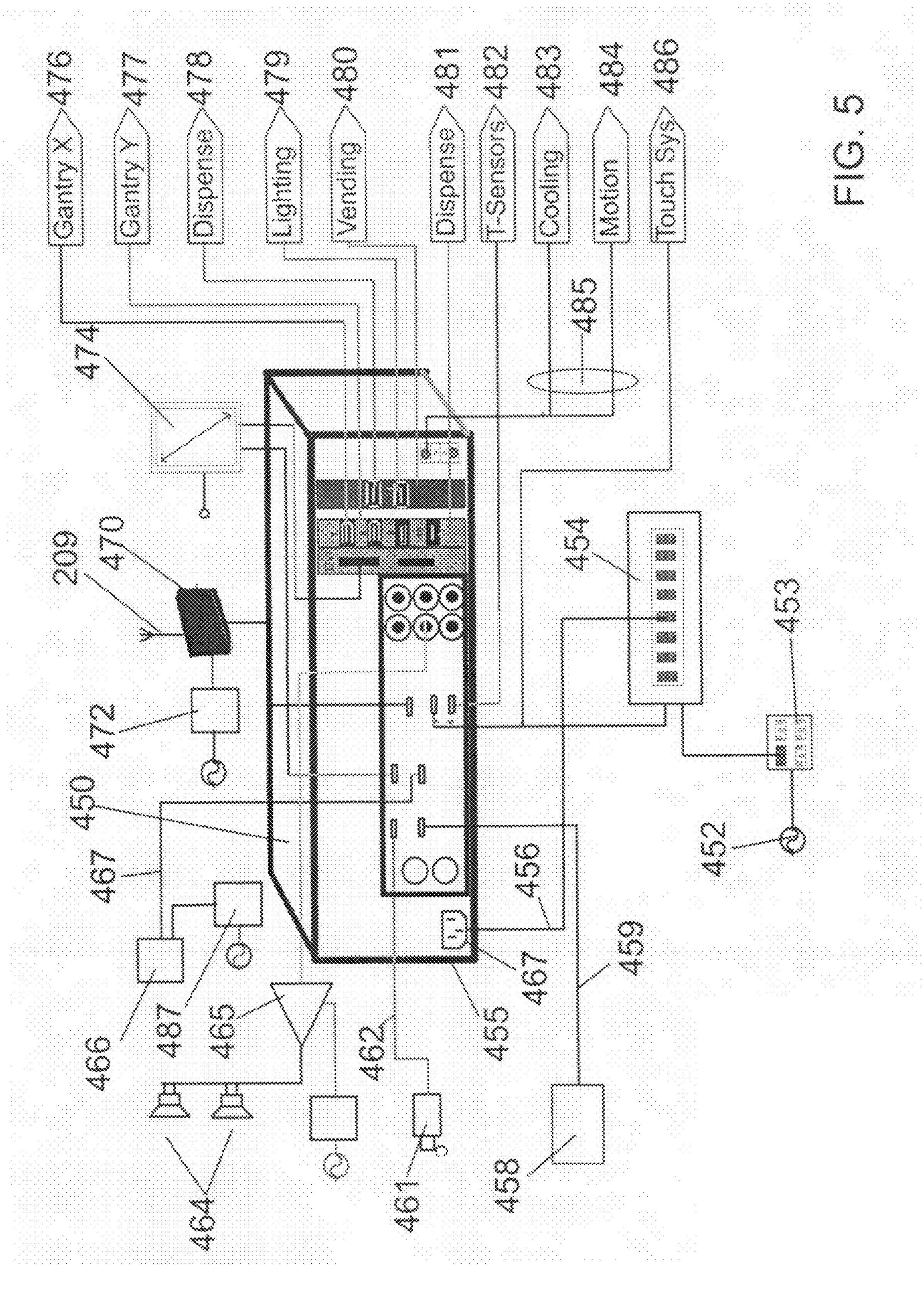
FIG. 5 is a diagrammatic view showing the preferred interconnection of the system computer and lighting control.
Figure 6:
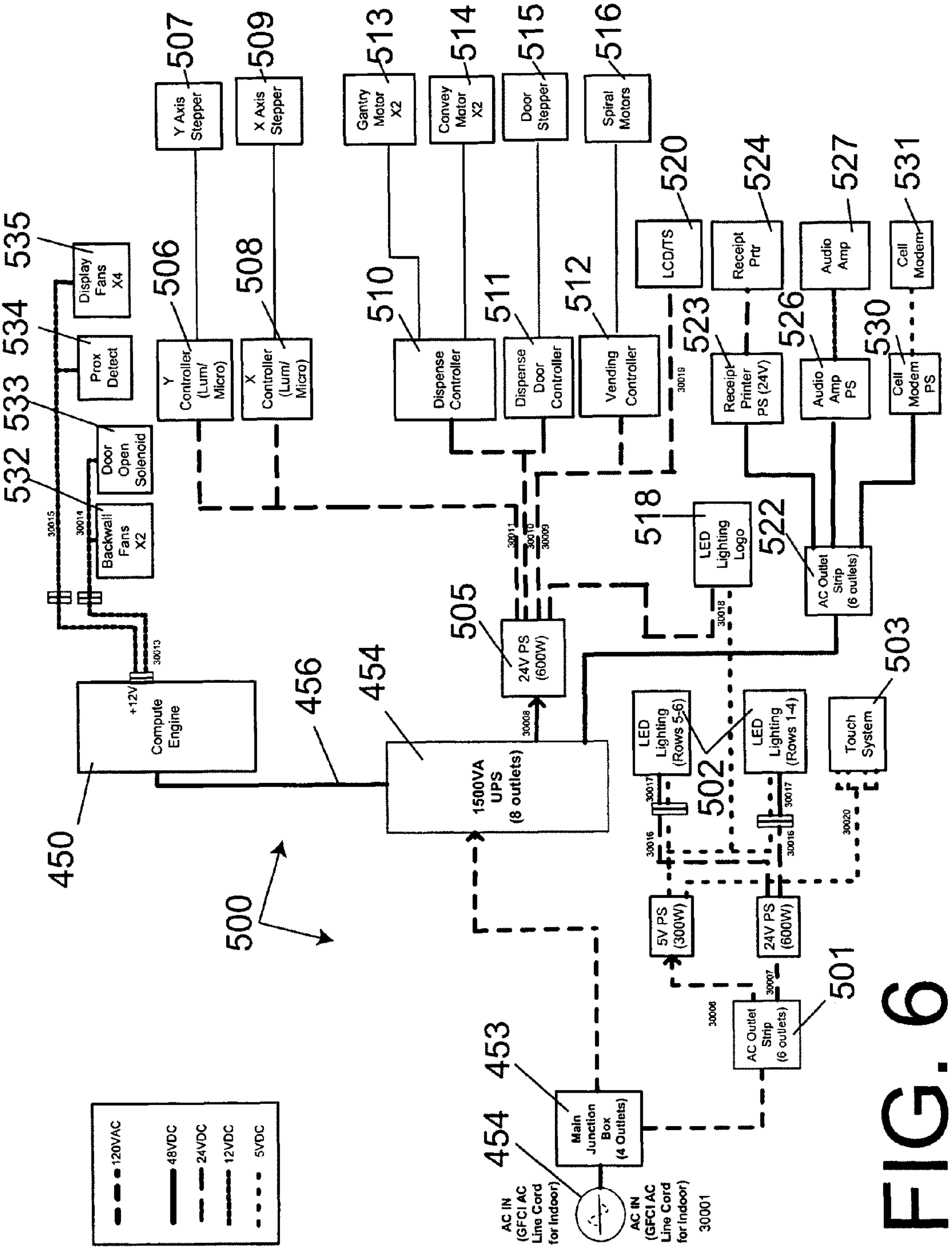
FIG. 6 is a block diagram of the preferred electrical power supply arrangement; is a fragmentary isomeric view showing the backlight system, with portions thereof omitted for clarity and brevity.

FIGS. 5 and 6 illustrates system wiring to interconnect with a computer 450 such as Advantech's compute engine with a 3 Ghz (8400) CPU, 1 GB of RAM memory, 320 GB 7200 RPM HDD, 12 USB ports, 1 Serial port, Audio output and Microphone input. The CPU-controlled computer 450 (FIG. 5) communicates to the lighting system network controller via line 479. Through these connections, the lighting system is integrated to the rest of system. Power is supplied through a plug 452 that powers an outlet 453, which in turn powers a UPS 454 such as TripLite's UPS (900W, 15VA) (part number Smart1500LCD) that conditions source power, which is applied to input 455 via line 456. Power is available to accessories through outlet 453 and UPS 454.

Computer 450 (FIG. 5) is interconnected with a conventional payment reader 458 via cabling 459. An optional web-accessing camera 461 such as a LOGITECH webcam (part number 961398-0403) connects to computer 450 via cabling 462. Audio is provided by transducers 464 such as Happ Controls 4" speakers (part number 49-0228-00R) driven by audio amplifier 465 such a Happ Controls Kiosk 2-Channel Amplifier with enclosure (part number 49-5140-100) with approximately 8 Watts RMS per channel 10% THD (10 Watts RMS @16v Input) and audio input of a 3.5 mm stereo jack and audio output 0.100" center locking header connector connected to computer 450. A receipt printer 466 such as Epson's EU-T300 Thermal Printer connects to the computer 450 via cabling 467. The printer is powered by a low voltage power supply such as Epson's 24VDC power supply (partn number PS-180). A remote connection with the computer 450 is enabled by a cellular link 470 such as Multitech's Verizon CDMA cellular modem (part number MTCBA-C-IP-N3-NAM) powered by low voltage power supply 472. The cellular link 470 is connected to an exterior antenna 209. A touch enabled liquid crystal display 474 such as a Ceronix 22" Widescreen (16:10) Touch Monitor for computer operation also connects to computer 450.

Digital connections are seen on the right of FIG. 5. Gantry-X, a stepper motor controller such as the Arcus Advanced Motion Driver+Controller USB/RS485 (part number Arcus ACE-SDE), and Gantry-Y a stepper motor controller such as the Arcus Advanced Motion Driver+Controller USB/RS485 (part number Arcus ACE-SDE) connections are designated by the reference numerals 476 and 477 respectively. Dispenser control output is designated by the reference numeral 478. LED lighting control signals communicate through USB cabling 479 to a DMX controller 622, that transmits digital lighting control signals in the RS-485 protocol to the display tube lighting circuit board arrays. An ENTTEC -brand, model DMX USB Pro 512 I/F controller is suitable. Cabling 480 leads to vending control. Dispenser door control is effectuated via cabling 481. Touch sensor inputs arrive through interconnection 482. Cooling fans are controlled through cabling 483. Motion sensor inputs from a motion sensor such as Digi's Watchport/D (part number Watchport/D 301-1146-01) are received through connection 484. Cabling connections 483 and 484 are shielded as indicated by reference numeral 485. The touch system is connected to the computer 450 via cabling 486.

FIG. 6 illustrates a more detailed alternative power distribution arrangement 500. Because of the various components needed in the system, power has to be converted to different voltages and currents throughout the entire system. The system is wired so that it can run from standard 110V.A.C. power used in North America. It can be converted to run from 220 V.A.C. for deployments where necessary. Power supplied through plug 452 powers an outlet 453 (FIGS. 5, 6) that power UPS 454 that conditions source power, which is applied to input 455 via line 456. Power is available to accessories through outlet 453 and UPS 454. An additional AC outlet strip 501 such as Triplite's 6 position power strip (part number TLM606NC) powers LED lighting circuits 502 and a touch system 503.

A 24V DC Power Supply Open Frame 24VDC, 6.3 A, 150W power supply 505 powers Y controller 506 such as the Arcus Advanced Motion Driver+Controller USB/RS485 (part number Arcus ACE-SDE), that connects to Y axis stepper 507 such as the Moons stepper motor (part number Moons P/N 24HS5403-01N) and X controller 508 such as the Arcus Advanced Motion Driver+Controller USB/RS485 (part number Arcus ACE-SDE), that connects to X axis stepper such as the Moons stepper motor (part number Moons P/N 24HS5403-01N). Power supply 505 also powers dispenser controller 510, dispenser door control 511, and vending controller 512 that respectively powers two gantry motors 513 and 2 conveyor motors 514 such as Canon DC gear motors (part number 05S026-DG16), door stepper motor 515 such as a Canon DC gear motor (part number 05S026-DG16), and spiral motors 516 such as the Vendapin Universal 24 volt DC gear motor (part number 605008-001). The logo space 201 (FIG. 2) is illuminated by lighting 518 (FIG. 6) powered by supply 505. Supply 505 also powers LCD touch screen block 520 (FIG. 6) such as a Ceronix 22" Widescreen (16:10) Touch Monitor. UPS 454 (FIG. 6) also powers an AC outlet strip 522 that in turn powers a receipt printer power supply 523 such as Epson's 24VDC power supply (partn number PS-180) that energizes receipt printer 524 such as Epson's EU-T300 Thermal Printer, an audio power supply that powers audio amplifier 527 such a Happ Controls Kiosk 2-Channel Amplifier with enclosure (part number 49-5140-100), and a low voltage cell modem power supply 530 that runs cellular modem 531 such as Multitech's Verizon CDMA cellular modem (part number MTCBA-C-IP-N3-NAM).

Figure 7:
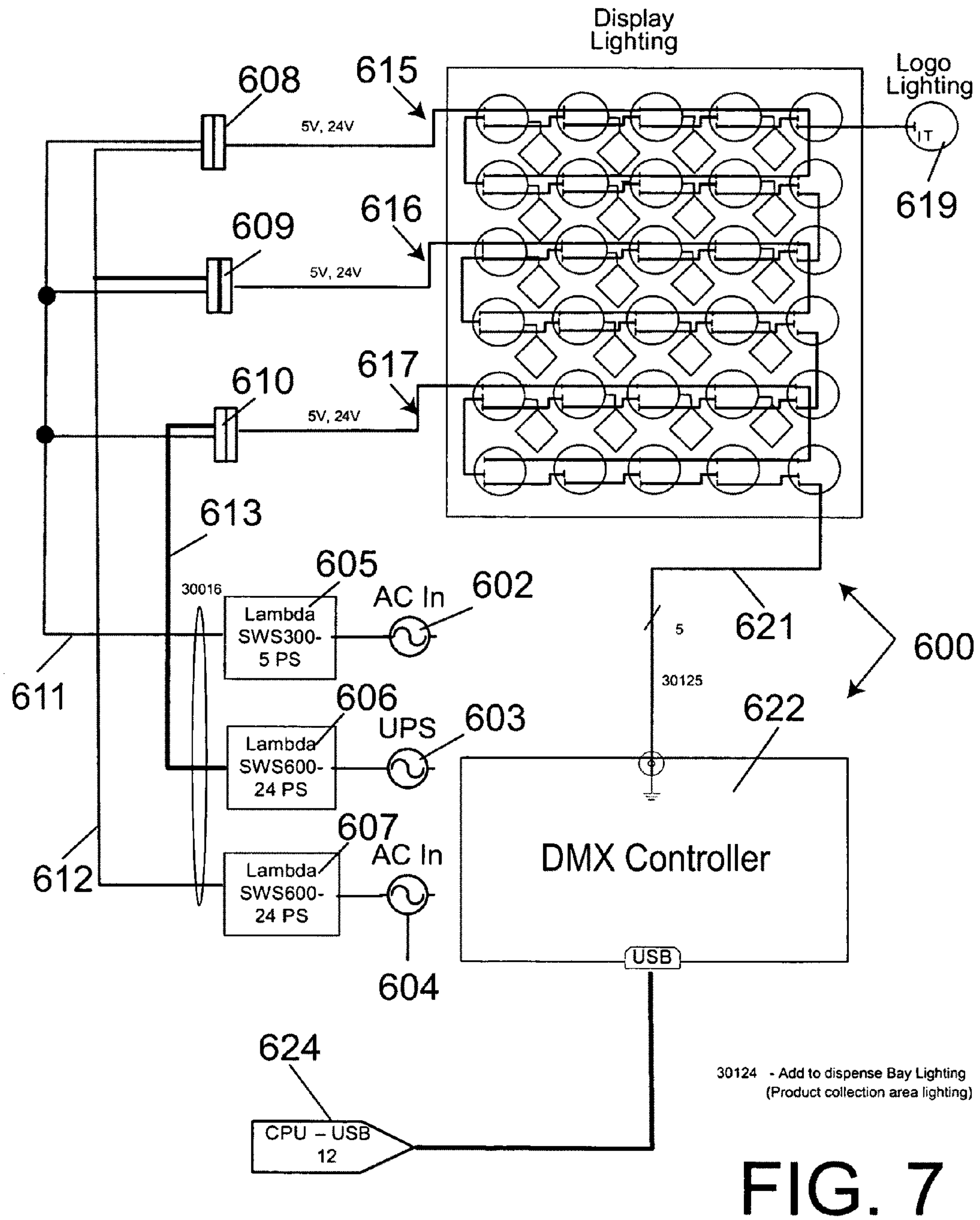
FIG. 7 is an abbreviated block diagram of the preferred lighting circuit.

Lighting wiring 600 is detailed in FIG. 7. A/C inputted at 602, 603 and 604 respectively powers a 12V DC Power Supply Open Frame, 12.5 A, 150W 605 such as Lambda's power switch (part number SWS150-12), and two 24V DC Power Supplies (24VDC, 6.3 A, 150W) 606, 607 such as those by Lambda (part number SWS150-24). Power switch 605 supplies 5 volt power on cable 611. Power switches 606 and 607 supply 24 volt power on cables 613 and 612 respectively. One 5 volt power wire and two 24 volt power wires are connected on a multi-wire cable in connectors 608, 609 and 610. From there, multiwire cables 615, 616 and 617 carry the 5 volt power and two 24 power wires to each LED board. The two 24 volt wires power the lights and the 5 volt wire is fused or the logic on the LED board 400. Items 608, 609, and 610 respectively connect to daisy-chained subarrays 615, 616, and 617 of LEDS (FIG. 7). Logo lighting at 619 is also powered by item 608.

The LED subarrays 615-617 are daisy chained and connected to DMX controller 622 such as ENTTEC DMX USB Pro 512 I/F Controller, outputting digital signals on line 621 DMX controller 622 is connected via a USB connection to the computer 450 (FIG. 5). DMX controller 622 connects to the first LED board in the daisy chain. Each board is linked together in a series in this fashion with an input and an output signaling cable. There can be any number of LED boards as needed to fit the display deployment. The last LED board in the series is typically the light used for a logo or branding signage. Alternatively, this can be the first board in the series or in between two sets of LED display boards. Additional lights to illuminate an optional product collection area in a vending unit and lights to illuminate advertising signage can also be hooked up to this series of lights. Power comes from a standard alternating current outside source such as an electrical outlet. This power is converted as necessary to power the LED lights according to the LED specifications. Different types of LEDs can be used in any implementation and the power converters will change accordingly.

Figure 8:
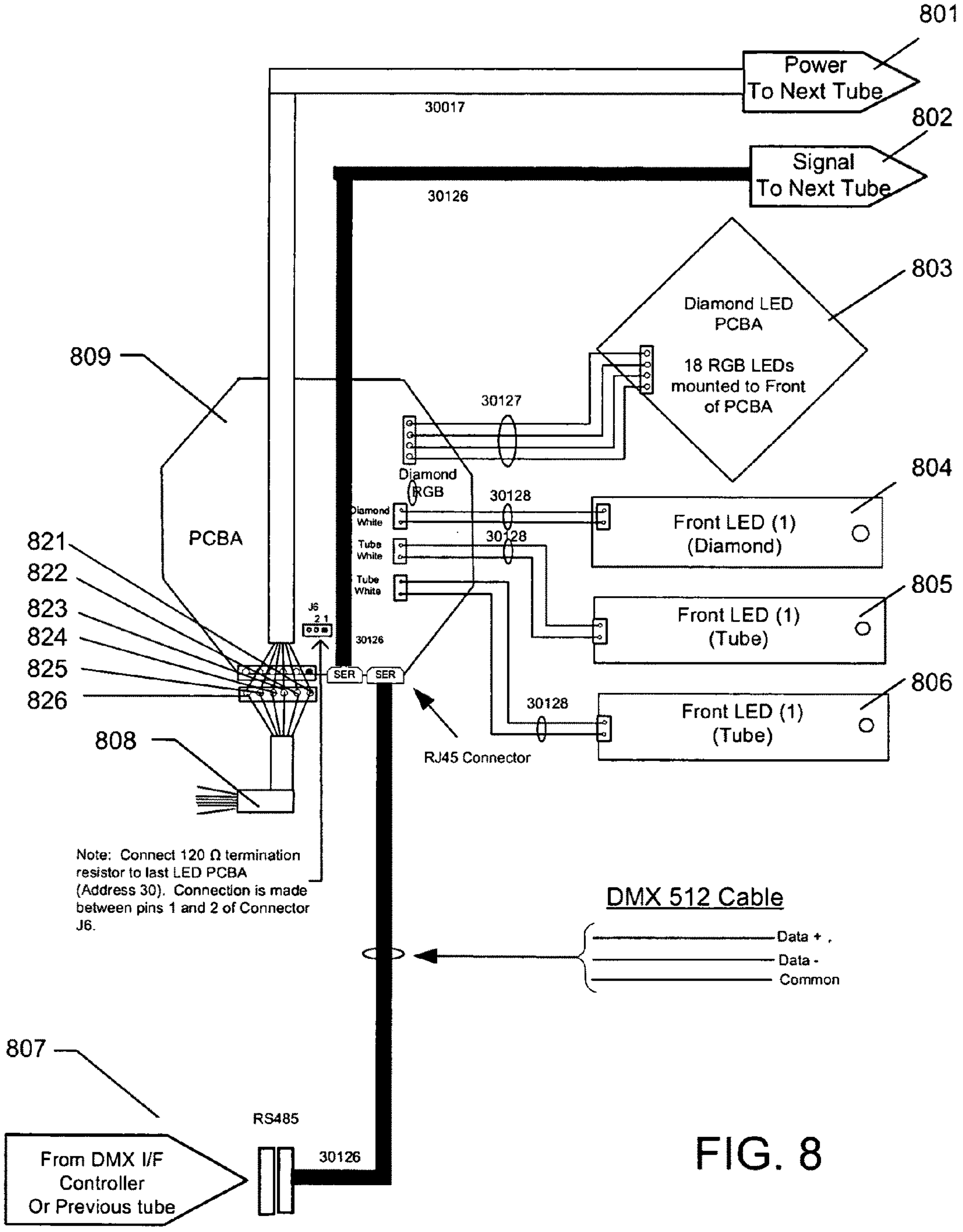
FIG. 8 is a block diagram of the preferred lighting circuit showing interconnection of a circuit board of FIG. 4.

FIG. 8 details the lighting element connections. In a preferred implementation of the LED lighting system, each LED circuit board 809 (similar to boards 101 in FIG. 1) controls the RGB backlights on the current board, front white showcase lights such as Cree XLamp® 7090 XRE (part number L1-WN-P4-0-01) 805 and/or 806 for the current display area and the RGB backlight board 803 in a smaller display tube, and white front lights 804 such as Cree XLamp® 7090 XRE (part number L1-WN-P4-0-01) for the adjacent board. Each one of these configurations is hooked up in a daisy chain series. The board receives a communication signal from the previous board 807 and then passes that signal onto the next board at 802. The power is also passed in and out of each board 801. The address of the current board is set through a 6 wire set 808. Connected to exposed pins 821, 822, 823, 824, 825, and 826. Pin number one 821 carries 24 volts. Pin number two 822 is a ground. Pin number three 823 carries 24 volts. Pin number four 824 is a ground. Pin number five 825 is a ground. Pin number six 826 carries 5 volts and is used to power the PCBA 809. A terminator is put on the last board in the chain.

Figure 9:
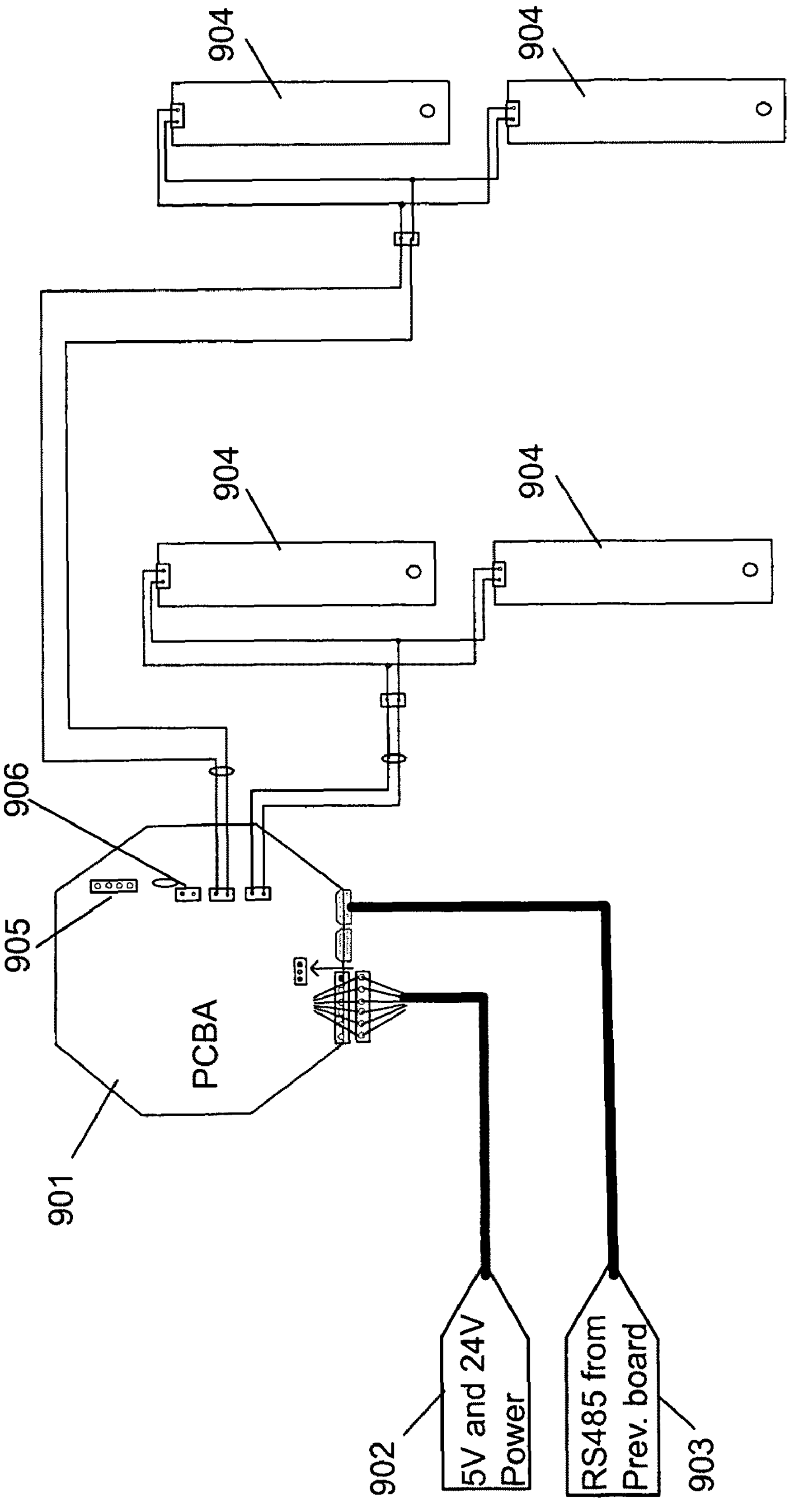
FIG. 9 is block diagram of a preferred lighting circuit for signage and item collection area lighting.

In FIG. 9 lighting is wired to accommodate illuminated signage and lighting for the area where a user collects a purchased item. 24 volt and 5 volt power at input 902 and a signal at 903 are supplied to the signage board 901. Connections on this board can be used to power and control one or more white LEDs 904 such as Cree XLamp® 7090 XRE (part number L1-WN-P4-0-01) that can be placed in a product collection area and lit to guide a user and illuminate a purchased product/item. A connection is supplied 905 to attach an additional optional LED RGB backlight board and a connection 906 to attach an optional white LED light such as Cree XLamp® 7090 XRE (part number L1-WN-P4-0-01) to enhance existing signage or for additional signage lighting.

Figure 10:
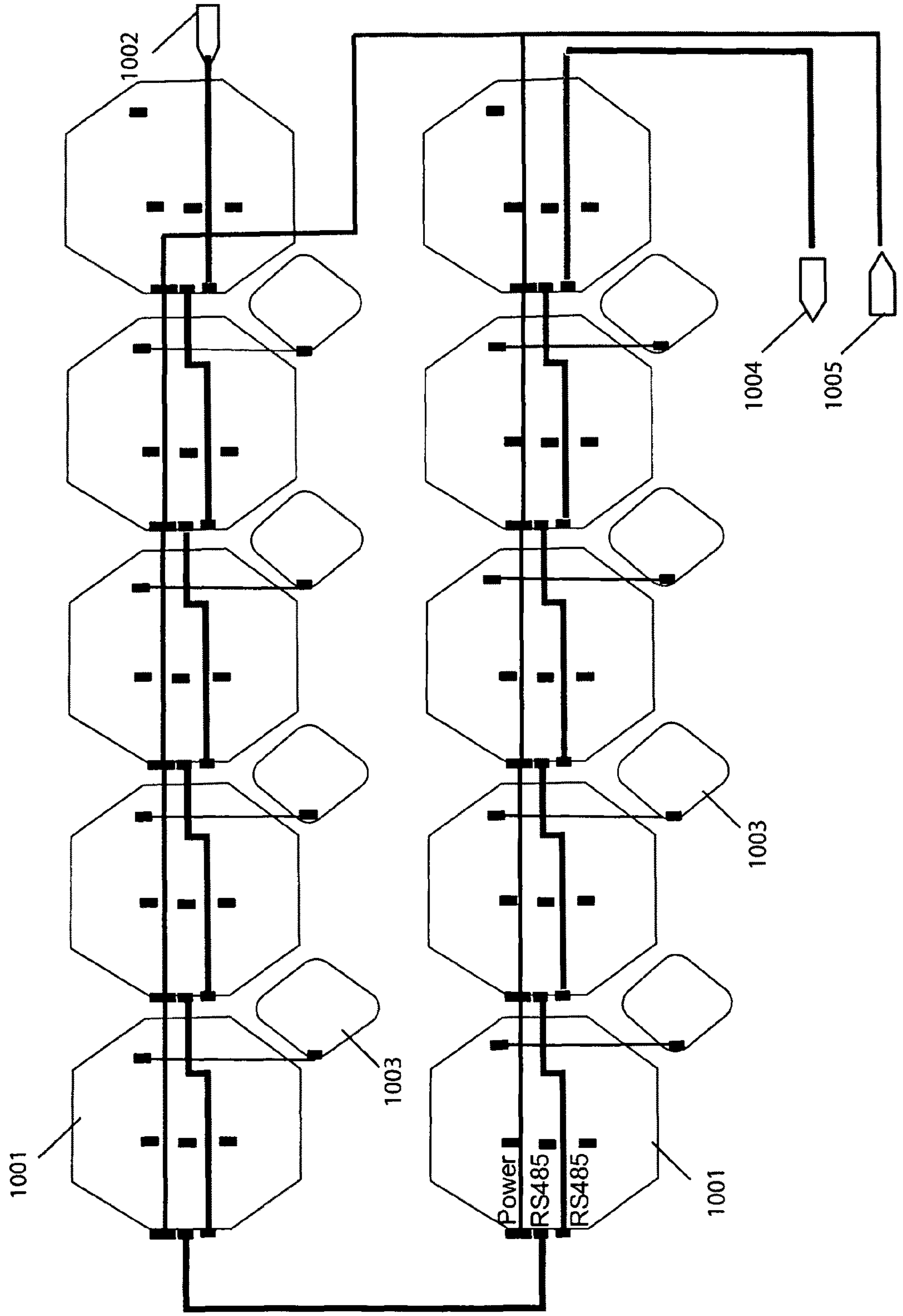
FIG. 10 is a block diagram showing a plurality of daisy changed lighting circuit boards.

In FIG. 10 lighting series wiring is disclosed. Any number of lights can be connected in a daisy chain series to light up product display, signage and user interaction areas such as bins to collect products, near controls that user's need to use, etc. At the beginning of a chain is a DMX controller 1002 that is connected to a CPU and a power connection 1005. The DMX controller communicates with one or more main LED boards 1001. These can be optionally connected to smaller supplementary LED boards 1003 of various shapes. This arrangement allows efficient coverage's of a display area. These groups of lights can be connected in series 1004 using RS485 signaling to create any display area shape.

Figure 11:
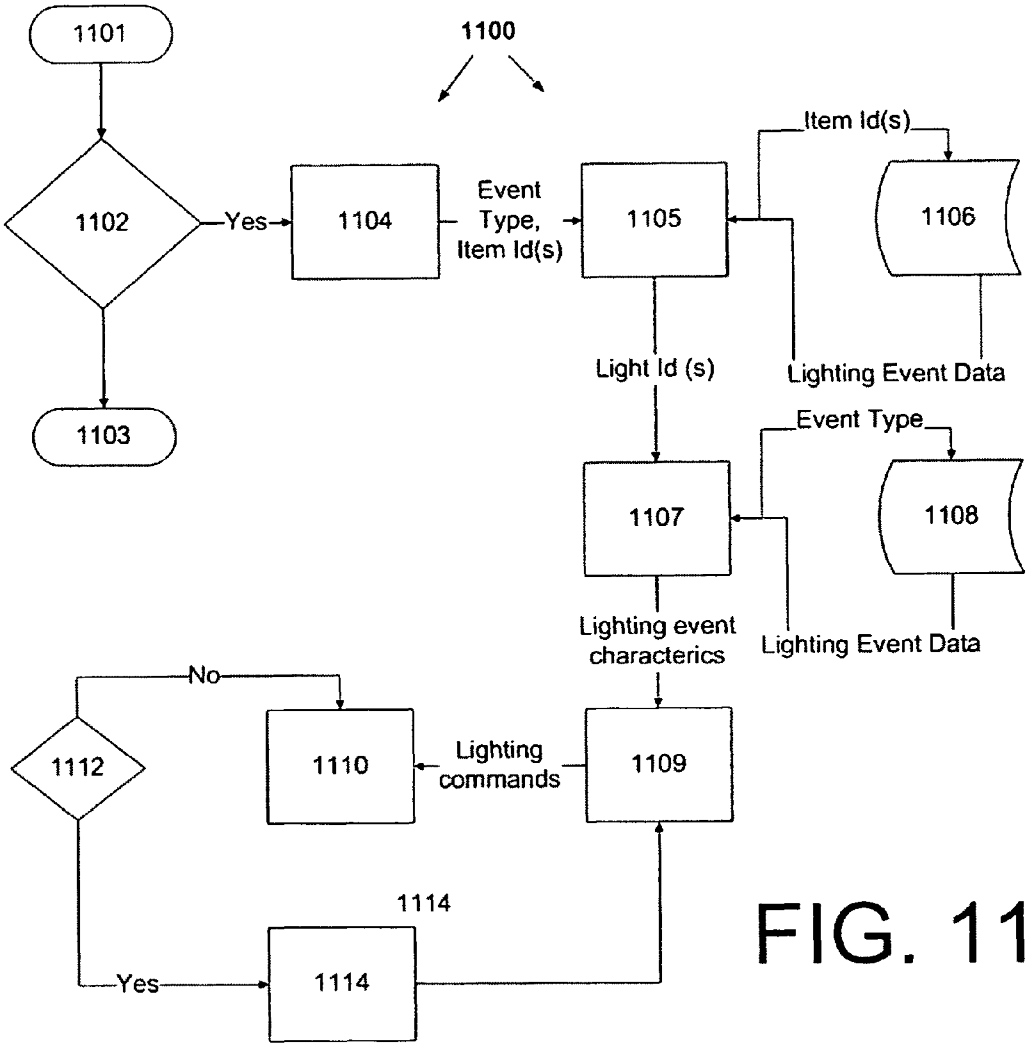
FIG. 11 is a block diagram of the preferred lighting event selection software; and, FIG. 12 is a block diagram of the preferred user or customer interaction software.

FIG. 11 illustrates a general software implemented lighting process 1100. The system uses a set of customizable lighting events that are programmed as a set of data stored in either a database or flat file storage system that are called by the software based on user interaction. User interaction determines which item(s) are to be lit. There is a data store that maps items to the physical lights. This is set during the configuration setup and called at runtime. Each lighting event contains information on which light(s) to display, color of background, intensity, fade timing, foreground lighting (showcase lighting). This information can be dynamically passed in to the lighting event routine using the lighting event data template to guide the outcome. There is no limit on the number of "events" that are stored and triggered by the software. After an event is programmed in the software, the characteristics of that lighting event can be customized through data entry. This does not require the software to be reprogrammed or recompiled. The software reads the data in the data field at runtime and executes according to the values stored. This has a great advantage in that non-technical people can define how the lighting events behave without the need of a trained professional such as a computer programmer or a computer scientist or computer engineer.

User input step 1101 is queried at step 1102 to determine whether a lighting event has been selected. If not, the process ends at 1103, and if so, the type of event is determined in steps 1104 and 1105. An item ID and light mapping datacode are developed in step 1106. Selected lighting event characteristics are looked up and determined in step via database query step 1108. The identified lighting event is converted to the DMX protocol in step 1109. The DMX controller executes the lighting event and the hardware of FIGS. 7-10 responds. If an error is determined in step 1112, a light reset command is generated in step 1114 that resets step 1109.

Figure 12:
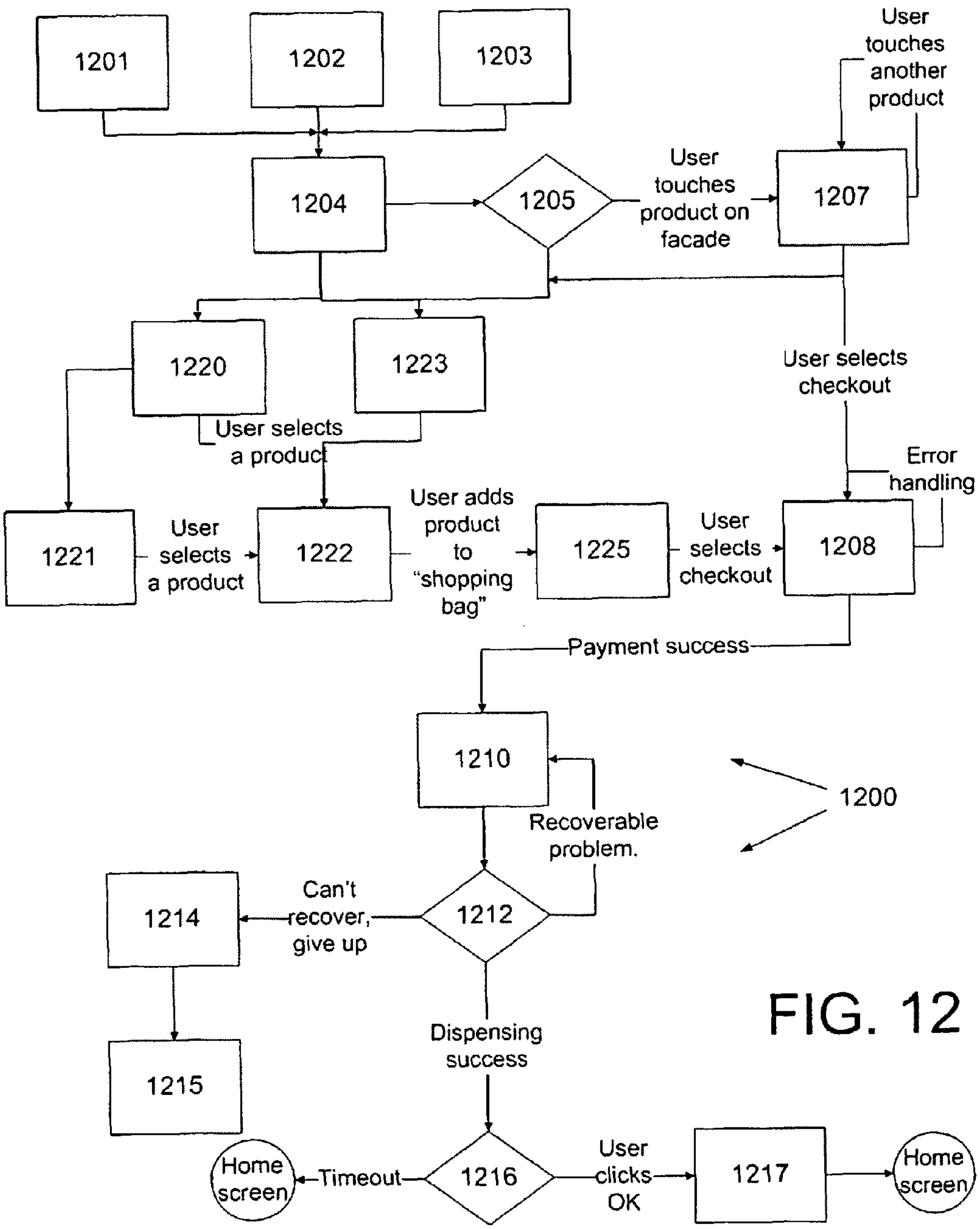

User lighting software steps are detailed in process 1200 (FIG. 12.) Program 1200 begins (after power up and initiation) with a user input. A user starts the process when they interact with the machine in a detectable way. This may be by using the touch screen in step 1021, touching an activated touch sensitive façade area in step 1202, or triggering a sensor such as a motion sensor, magnetic field sensor or a weight sensor connected to the machine in step 1203. Each of these cause an event to be recognized that was pre-programmed to use dynamic variables generated by the user and apply them to the lighting rules preconfigured by an administrative user. After the user triggers the machine, they may browse products in step 1204, go into a rapid shopping mode (here described as Grab and Go mode) in step 1205. When a user elects step 1205, he or she can select products in step 1207 which triggers selectively variable lighting through the previously described software and hardware. When checkout is selected, the checkout process step 1208 determines payment success, and dispensing occurs in step 1210. Errors are detected in step 1212, and if possible, corrections information is delivered for retry to step 1210. If the product cannot be vended, an error display occur in step 1214 and the customer is credited in step 1215. If the vend occurs, the user is prompted to physically pick up the product in step 1216 and a "thank you" message is initiated by step 1217.

If users select the "browse" option in step 1220 similar products available for vending are determined in step 1221 and such similar products are illuminated via step 1222. Top picks can be selected in step 1223. Products are added to a "shopping cart" in step 1225, which then triggers step 1208 previously described.

Thus software process 1200 allows users to typically use the system to navigate to items/products in which they are interested and choose to add ones they wish to purchase to a virtual shopping bag. When users are navigating the products, the system is programmed to recognize the current event and initiate a lighting sequence. A user viewing a product on the touch screen will have the physical product (or representation of that product) illuminate in the display case according to preset values that determine the backlight lighting color, intensity of that backlight color, fading and lighting patterns such as color transitions, blinking and other light oscillations along with the intensity of front showcase lighting that shines on the front area of a product or item. Product/item associations can also be programmed into the system. For example, the product database stores various associates a product may have such as type of product, manufacturer of product, price range, special or sales pricing. The number of associations a product might have is infinite and determined only by the administrator that sets up a given product catalog. The lighting system can be programmed to use any of these associations and light up the areas in the display façade with a related association. These lighting scenarios assist the user in finding the products they wish to purchase and may increase the number of items that are sold to that user. After the user locates the products they wish to purchase and add them to their virtual shopping bag, they can initiate the checkout sequence. The lighting system recognizes this event and will use the items the user has selected as dynamic variables that it feeds into the event profile preprogrammed for this lighting event. A common example might be that all of the items a user is purchasing are illuminated with a given color in the display area and may blink or have the color oscillate to indicate to the user what items they are purchasing. Lights may be located on the machine that guide the user to controls in which they need to interact with to complete the process. For example, a light near the payment read (e.g. a credit card reader) can be illuminated when it is time for a user to swipe and have their credit card read. This simplifies the buying process by prompting the user what they next step in the process is. Dispensing products is another recognizable event where the system can be programmed to use lighting to indicate what product is being dispensed at the current time. As products are dispensed, the lighting can be programmed to change so the user knows which items have been dispensed and which items have to be dispensed.

After items are dispensed, a collection event is launched where the collection area can be illuminated to guide the user where to retrieve their products and provide lighting so they can more easily be seen. The system resets itself to a standby lighting event after a transaction is complete. The system can also be programmed to go into an idle mode after a preset amount of time. This idle mode lighting event sequence is often used to attract users to the system where the process begins again.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vending display for vending machines, retail displays, and automated retail stores, the display comprising:

- a lighting display module adapted to be secured to a console that comprises a supply of selectable items to be vended and means for effectuating vending transactions, the module comprising:
  - a rigid display case that provides a housing;
  - an array of primary product display tubes disposed within the housing containing products offered for vending, the display tubes visibly associated with the console and arranged in a geometric pattern of rows and columns;
  - an array of lighting circuit boards for illuminating each display tube with colored light, each circuit board comprising a plurality of lights of different colors, the circuit boards daisy chained together forming an addressable network, and each board comprising an addressable network address;
  - a plurality of touchable product viewing areas, one viewing area associated with each product display tube;
  - sensor means associated with each product viewing area for detecting customer selections;
- a computer for activating and controlling the display module to respond to said sensors and initiate varying lighting effects;
- software for controlling said computer; and, a network interface controller driven by said computer for activating combinations of lights on selected lighting circuit boards to illuminate specific product display tubes.

2. The vending display as defined in claim 1 wherein the circuit board plurality of lights comprises banks of red, green and blue LEDs that can be separately activated by said network interface.

3. The vending display as defined in claim 2 wherein said network interface comprises a DMX controller for driving said network interface with digital signals for activating combinations of lights on said lighting circuit boards through said daisy chain.

4. The vending display as defined in claim 3 further comprising:

means proximate said primary display tubes for diffusing light;

white showcase lights for illuminating products contained within said primary display tubes; and, a touch screen for enabling customer selection of products.

5. The vending display as defined in claim 3 further comprising:

a plurality of secondary display tubes of a smaller diameter than the primary display tubes, the secondary display tubes disposed in a regular geometric pattern between adjacent primary display tubes;

a plurality of lighting circuit boards for illuminating said secondary display tubes in response to said network interface controller.

6. The vending display as defined in claim 5 wherein:

the console comprises;

a customizable, lighted logo area;

a touch screen for enabling customer selection of products;

a payment system; and, said computer comprises:

means for controlling a product dispenser; and, means for recognizing touch sensor inputs.

7. The vending display as defined in claim 3 wherein said software executes a user lighting routine comprising:

a step for recognizing user input from either the touch screen, a touched product display area, or a motion or proximity sensor; and, steps for activating said lighting circuit boards.

8. The vending display as defined in claim 7 wherein said steps for activating said lighting circuit boards comprises steps for:

establishing a data set file storage system defining customizable lighting events, the lighting events defining selected colors, lighting intensity, and lighting fade timing;

establishing data storage for mapping lighting circuit boards associated with each display tube;

determining a selected item ID and corresponding light mapping datacode from said data storage step in response to a user input;

looking up lighting characteristics in a database query for a lighting event identified in said determining step;

converting identified lighting events to a DMX protocol;

wherein the network interface controller executes the lighting event and activates particular lighting circuit boards.

9. A vending display for vending machines, retail displays, and/or automated retail stores that comprise a supply of selectable items to be vended, the display comprising:

a lighting display module in the form of a door coupled to said vending machine, retail display, or automated retail store, the display module comprising means for effectuating vending transactions, the display module comprising:

a rigid display case that provides a housing;

an array of primary product display tubes disposed within the housing containing products offered for vending, the display tubes visibly associated with the display case and arranged in a geometric pattern of orderly rows and columns;

an array of primary lighting circuit boards for illuminating each primary display tube with colored light, each primary circuit board comprising a plurality of red, green and blue LEDs, the circuit boards daisy chained together forming an addressable network, each board comprising an addressable network address, and wherein each circuit board is sized to approximately match dimensions of said primary display tubes;

a plurality of touchable product viewing areas, one viewing area associated with each primary product display tube;

sensor means associated with each product viewing area for detecting customer selections;

a computer for activating and controlling the display module to respond to said sensors and initiate varying lighting effects;

software for controlling said computer, the software recognizing the selection of products to be vended and associates predefined lighting events with products to be vended; and, a DMX controller driven by said computer for addressing and activating combinations of LEDs on selected lighting circuit boards to illuminate specific product display tubes by implementing said predefined lighting events within said primary lighting tubes associated with selected products.

10. The vending display as defined in claim 9 further comprising:

a plurality of secondary display tubes of a smaller diameter than the primary display tubes, the secondary display tubes disposed in a regular geometric pattern between adjacent primary display tubes; and, a plurality of secondary lighting circuit boards for illuminating said secondary display tubes in response to said DMX controller, each secondary circuit board comprising a plurality of red, green and blue LEDs, the secondary circuit boards daisy chained together within said addressable network, each secondary board comprising an addressable network address, and wherein each secondary circuit board is sized to approximately match dimensions of said secondary display tubes.

11. The vending display as defined in claim 9 wherein said software executes a user lighting routine comprising:

a step for recognizing user input from either a touch screen, a touched product display area, or a motion or proximity sensor; and, steps for activating said lighting circuit boards.

12. The vending display as defined in claim 11 wherein said steps for activating said lighting circuit boards comprises steps for:

establishing a data set file storage system defining customizable lighting events, the lighting events defining selected colors, lighting intensity, and lighting fade timing;

establishing data storage for mapping lighting circuit boards associated with each display tube;

determining a selected item ID and corresponding light mapping datacode from said data storage step in response to a user input;

looking up lighting characteristics in a database query for a lighting event identified in said determining step;

converting identified lighting events to a DMX protocol;

wherein the network interface controller executes the lighting event and activates particular lighting circuit boards.

13. In a vending machine comprising an upright cabinet, a supply of selectable items to be vended, a control column for customer operation of said vending machine, and means for physically discharging selected products for a vend, the improvement comprising:

a lighting display module in the form of a door coupled to said vending machine, retail display, or automated retail store, the display module comprising means for effectuating vending transactions, the display module comprising:

a rigid display case that provides a housing;

an array of primary product display tubes disposed within the housing containing products offered for vending, the display tubes visibly associated with the display case and arranged in a geometric pattern of orderly rows and columns;

an array of primary lighting circuit boards for illuminating each primary display tube with colored light, each primary circuit board comprising a plurality of red, green and blue LEDs, the circuit boards daisy chained together forming an addressable network, each board comprising an addressable network address, and wherein each circuit board is sized to approximately match dimensions of said primary display tubes;

a plurality of touchable product viewing areas, one viewing area associated with each primary product display tube;

sensor means associated with each product viewing area for detecting customer selections;

a computer for activating and controlling the display module to respond to said sensors and initiate varying lighting effects;

software for controlling said computer, the software recognizing the selection of products to be vended and associates predefined lighting events with products to be vended; and, a DMX controller driven by said computer for addressing and activating combinations of LEDs on selected lighting circuit boards to illuminate specific product display tubes by implementing said predefined lighting events within said primary lighting tubes associated with selected products.

14. The improvement as defined in claim 13 further comprising:

means proximate said primary display tubes for diffusing light;

white showcase lights for illuminating products contained within said primary display tubes; and, a touch screen for enabling customer selection of products.

15. The improvement as defined in claim 14 wherein:

the column comprises;

a customizable, lighted logo area;

a touch screen for enabling customer selection of products;

a payment system; and, said computer comprises:

means for controlling a product dispenser; and, means for recognizing customer inputs.

16. The improvement as defined in claim 13 further comprising:

a plurality of secondary display tubes of a smaller diameter than the primary display tubes, the secondary display tubes disposed in a regular geometric pattern between adjacent primary display tubes; and, a plurality of secondary lighting circuit boards for illuminating said secondary display tubes in response to said DMX controller, each secondary circuit board comprising a plurality of red, green and blue LEDs, the secondary circuit boards daisy chained together within said addressable network, each secondary board comprising an addressable network address, and wherein each secondary circuit board is sized to approximately match dimensions of said secondary display tubes.

17. The improvement as defined in claim 16 wherein said software executes a user lighting routine comprising:

a step for recognizing user input from either a touch screen, a touched product display area, or a motion or proximity sensor; and, steps for activating said lighting circuit boards.

18. The improvement as defined in claim 17 wherein said steps for activating said lighting circuit boards comprises steps for:

establishing a data set file storage system defining customizable lighting events, the lighting events defining selected colors, lighting intensity, and lighting fade timing;

establishing data storage for mapping lighting circuit boards associated with each display tube;

determining a selected item ID and corresponding light mapping datacode from said data storage step in response to a user input;

looking up lighting characteristics in a database query for a lighting event identified in said determining step;

converting identified lighting events to a DMX protocol;

wherein the network interface controller executes the lighting event and activates particular lighting circuit boards.

19. The improvement as defined in claim 18 further comprising:

means proximate said primary display tubes for diffusing light;

white showcase lights for illuminating products contained within said primary display tubes; and, a touch screen for enabling customer selection of products.

20. The improvement as defined in claim 19 wherein:

the column comprises;

a customizable, lighted logo area;

a touch screen;

a payment system; and, said computer comprises:

means for controlling a product dispenser; and, means for recognizing customer inputs.

* * * * *